United States Patent
Beavis et al.

(10) Patent No.: US 12,204,811 B2
(45) Date of Patent: Jan. 21, 2025

(54) WIRELESS MICROPHONE SYSTEM AND METHODS FOR SYNCHRONIZING A WIRELESS TRANSMITTER AND A WIRELESS RECEIVER

(71) Applicant: Shure Acquisition Holdings, Inc., Niles, IL (US)

(72) Inventors: Simon John Beavis, Evanston, IL (US); Scott Kuhn, Evanston, IL (US); Mike Handler, Niles, IL (US); William Kevin Doss, Bull Valley, IL (US); Jack Wong, Chicago, IL (US); Christopher Frantisak, Oak Park, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 18/169,923

(22) Filed: Feb. 16, 2023

(65) Prior Publication Data
US 2023/0259323 A1     Aug. 17, 2023

Related U.S. Application Data

(60) Provisional application No. 63/353,962, filed on Jun. 21, 2022, provisional application No. 63/310,996, filed on Feb. 16, 2022.

(51) Int. Cl.
*H04R 1/00* (2006.01)
*G06F 3/16* (2006.01)

(52) U.S. Cl.
CPC .............. *G06F 3/162* (2013.01); *G06F 3/165* (2013.01); *H04R 1/00* (2013.01); *H04R 2420/07* (2013.01)

(58) Field of Classification Search
CPC .... G06F 3/165; G06F 13/4068; G06F 3/1446; G06F 3/162; G06F 15/16; G06F 3/01;
(Continued)

(56) References Cited

U.S. PATENT DOCUMENTS 6,762,788 B2    7/2004   Chang
7,574,011 B2    8/2009   Meyer et al.
(Continued)

FOREIGN PATENT DOCUMENTS

JP    2011150492 A    8/2011

OTHER PUBLICATIONS

Sep. 30, 2021—nRF5340 Product Specification v1.2, Nordic Semiconductor.
(Continued)

*Primary Examiner* — Rayeez R Chowdhury
(74) *Attorney, Agent, or Firm* — Banner & Witcoff, Ltd.

(57) ABSTRACT

The present disclosure describes a wireless microphone system that allows one or more microphones to wirelessly communicate with a receiver. Additionally, the wireless microphone system may allow for a plurality of microphones to be used interchangeably with the receiver. To ensure communication between the receiver and the one or more microphones, the receiver may occasionally transmit a synchronization signal to the one or more microphones. In response to receiving the synchronization signal, at least one of the one or more microphones may determine that a clock of the at least one microphone is drifting from the master audio clock of the receiver. The at least one microphone may then adjust the microphone's audio clock to re-synchronize the audio clock of the microphone with the master audio clock of the receiver.

25 Claims, 21 Drawing Sheets

(58) Field of Classification Search
CPC . G06F 3/017; G06F 3/041; G06F 3/05; G06F 3/14; G06F 3/1454; G06F 3/16; H04R 1/403; H04R 2227/003; H04R 2420/09; H04R 27/00; H04R 29/002; H04R 3/12; H04R 3/14

See application file for complete search history.

(56) References Cited

U.S. PATENT DOCUMENTS

| | | | |
|---|---|---|---|
| 7,711,443 | B1 | 5/2010 | Sanders et al. |
| 7,929,902 | B1 | 4/2011 | Sanders et al. |
| 8,155,593 | B2 | 4/2012 | Fehr |
| 8,223,881 | B2 | 7/2012 | Meyer et al. |
| 8,385,814 | B2 | 2/2013 | Sanders et al. |
| 8,811,375 | B2 | 8/2014 | Gha et al. |
| 8,842,854 | B1 | 9/2014 | Sanders et al. |
| 8,878,708 | B1 | 11/2014 | Sanders et al. |
| 9,094,636 | B1 | 7/2015 | Sanders et al. |
| 9,247,355 | B2 | 1/2016 | El-Hoiydi |
| 9,336,307 | B2 | 5/2016 | Sanders et al. |
| 9,406,224 | B1 | 8/2016 | Sanders et al. |
| 9,525,458 | B2 | 12/2016 | Schmidt et al. |
| 9,584,917 | B2 | 2/2017 | Menke et al. |
| 9,674,568 | B2 | 6/2017 | Du et al. |
| 9,735,917 | B2 | 8/2017 | Schmidt et al. |
| 9,756,441 | B2 | 9/2017 | Musialik et al. |
| 9,762,194 | B2 | 9/2017 | Kleinsorge et al. |
| 9,904,505 | B1 | 2/2018 | Sanders et al. |
| 9,911,433 | B2 | 3/2018 | Elliot et al. |
| 9,936,108 | B2 | 4/2018 | Menke et al. |
| 10,007,887 | B2 * | 6/2018 | Farrell ........... G06Q 10/063116 |
| 10,104,147 | B2 | 10/2018 | Schmidt et al. |
| 10,178,427 | B2 | 1/2019 | Huang |
| 10,230,342 | B1 | 3/2019 | Sanders et al. |
| 10,276,207 | B1 | 4/2019 | Sanders et al. |
| 10,362,379 | B2 | 7/2019 | Georgi et al. |
| 10,499,148 | B2 | 12/2019 | Georgi et al. |
| 10,567,827 | B2 | 2/2020 | Thiele et al. |
| 10,609,464 | B2 | 3/2020 | Georgi et al. |
| 10,686,897 | B2 | 6/2020 | Werner et al. |
| 10,863,258 | B2 | 12/2020 | Thien et al. |
| 10,901,680 | B1 | 1/2021 | Sanders et al. |
| 10,979,474 | B2 | 4/2021 | Haustein et al. |
| 11,006,234 | B2 | 5/2021 | Matthias et al. |
| 11,089,430 | B1 | 8/2021 | Sanders et al. |
| 11,482,242 | B2 * | 10/2022 | Jiang ...................... G10L 25/54 |
| 11,551,725 | B2 | 1/2023 | Werner et al. |
| 2005/0209852 | A1 * | 9/2005 | Beckert ............... B60R 16/0315 704/246 |
| 2011/0246804 | A1 * | 10/2011 | Kaburlasos ........... G06F 1/3203 713/340 |
| 2014/0029701 | A1 | 1/2014 | Newham et al. |
| 2014/0143587 | A1 * | 5/2014 | Rajapakse .......... H04N 21/4305 713/600 |
| 2017/0251469 | A1 | 8/2017 | Lee et al. |
| 2017/0366924 | A1 | 12/2017 | Thoen |
| 2019/0141440 | A1 * | 5/2019 | Georgi ..................... H04R 3/00 |
| 2019/0174557 | A1 | 6/2019 | Ueda et al. |
| 2020/0154203 | A1 | 5/2020 | Matthias et al. |
| 2020/0154226 | A1 | 5/2020 | Matthias et al. |
| 2020/0265869 | A1 * | 8/2020 | Werner .................... H04R 1/08 |
| 2020/0278826 | A1 | 9/2020 | Patil et al. |
| 2021/0104992 | A1 | 4/2021 | Cooper |
| 2021/0176680 | A1 | 6/2021 | Matthias et al. |
| 2021/0250712 | A1 | 8/2021 | Tossing et al. |
| 2022/0201113 | A1 | 6/2022 | Peng |

OTHER PUBLICATIONS

May 24, 2023—(WO) International Search Report and Written Opinion—App PCT/US2023/062694.

Azik Patrick et al: "Ultrasonic time, synchronization and ranging on smartphones", 21st IEEE Real-Time and Embedded Technology and Applications Symposium, IEEE, Apr. 13, 2015 (Apr. 13, 2015), pp. 108-118, XP032777181, DOI: 10.1109/RTAS.2015.7108422 [retrieved on May 14, 2015] the whole document.

* cited by examiner

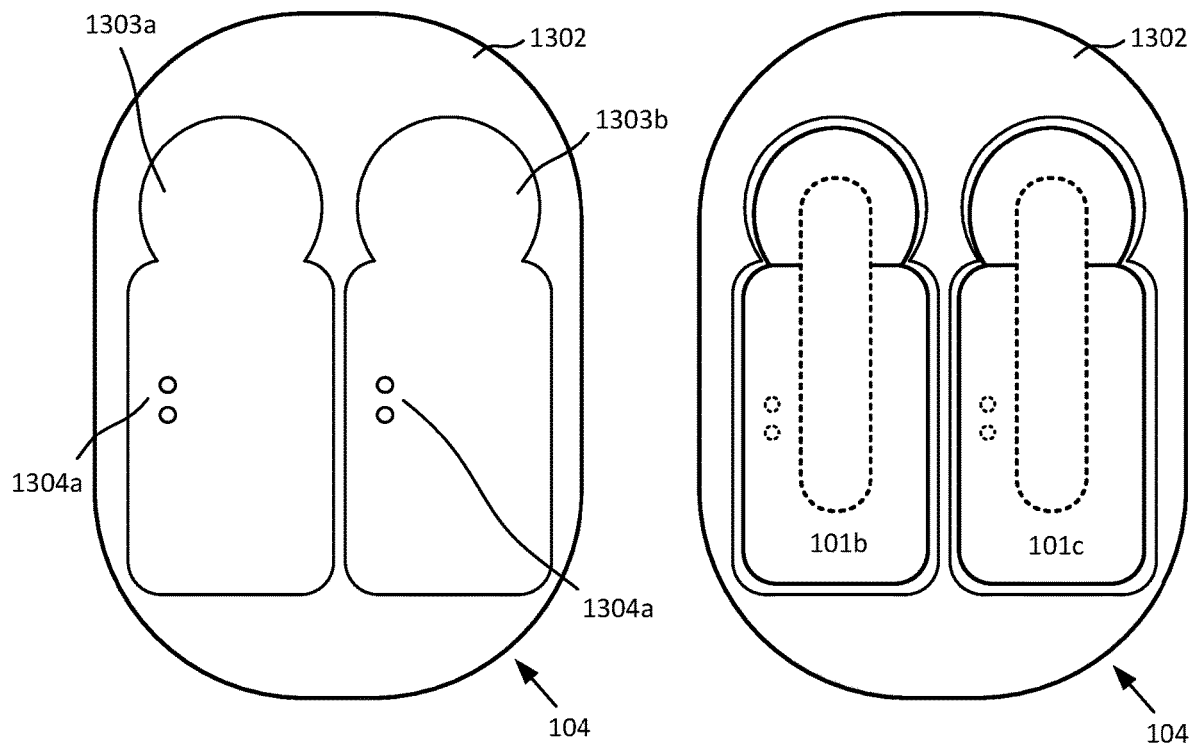
FIG. 13A  FIG. 13B
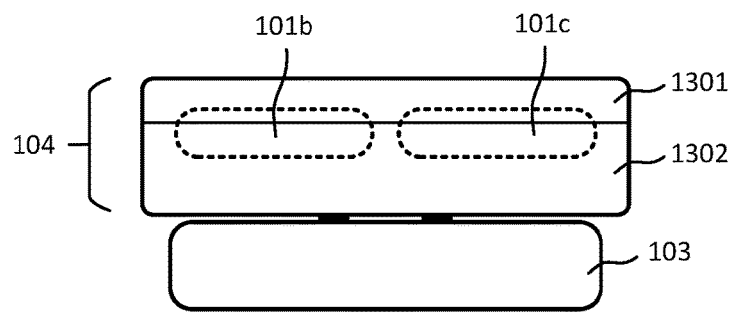
FIG. 13C

WIRELESS MICROPHONE SYSTEM AND METHODS FOR SYNCHRONIZING A WIRELESS TRANSMITTER AND A WIRELESS RECEIVER

CROSS REFERENCE TO RELATED APPLICATIONS

This application claims priority to U.S. Provisional Application No. 63/310,996, filed on Feb. 16, 2022 and entitled "Wireless Microphone System," and U.S. Provisional Application No. 63/353,962, filed on Jun. 21, 2022 and entitled "Synchronizing a Transmitter and a Receiver in a Wireless Microphone System," both of which are hereby incorporated, by reference, in their entireties.

BACKGROUND

While a variety of microphones are available on the consumer market, it would be desirable to provide a wireless microphone system, having additional flexibility to meet a variety of configurations.

SUMMARY

The following summary presents a simplified summary of certain features. The summary is not an extensive overview and is not intended to identify key or critical elements.

Examples of a wireless microphone system, elements thereof, and methods for operating the wireless microphone system, are described herein.

According to some aspects, a modular wireless microphone system is described in which a plurality of microphones may be interchangeably used to wirelessly communicate with the same wireless receiver. The number and type of wireless microphones communicating with the wireless receiver may be changed based on a desired use case. The various microphones of the wireless microphone system may be configured to wirelessly communicate with the wireless receiver using the same one or more data protocols, such that the microphones are interchangeable in the wireless microphone system.

According to further aspects, a specific wireless receiver may be used as a go-between to wirelessly receive audio as audio data from one or more of the wireless microphones and to provide a digital or analog signal representing the audio to another device connected to the wireless receiver. In further examples, another user device, such as a smart phone, tablet, laptop computer, and/or the like, may be configured (e.g., programmed) to wirelessly communicate directly with one, two, or more of the wireless microphones.

Additional aspects described herein disclose a technique for synchronizing data between the wireless receiver and the one or more wireless microphones. The wireless receiver may transmit a synchronization signal to one or more wireless microphones. In response to receiving the synchronization signal, at least one of the one or more wireless microphones may determine that a clock of the at least one microphone is drifting from the master audio clock of the receiver. The at least one microphone may adjust the microphone's audio clock to re-synchronize the audio clock of the microphone with the master audio clock of the receiver.

These and other features and potential advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 13A-13C illustrate an example charging case that may be part of a modular wireless microphone system.

DETAILED DESCRIPTION

Figure 1:
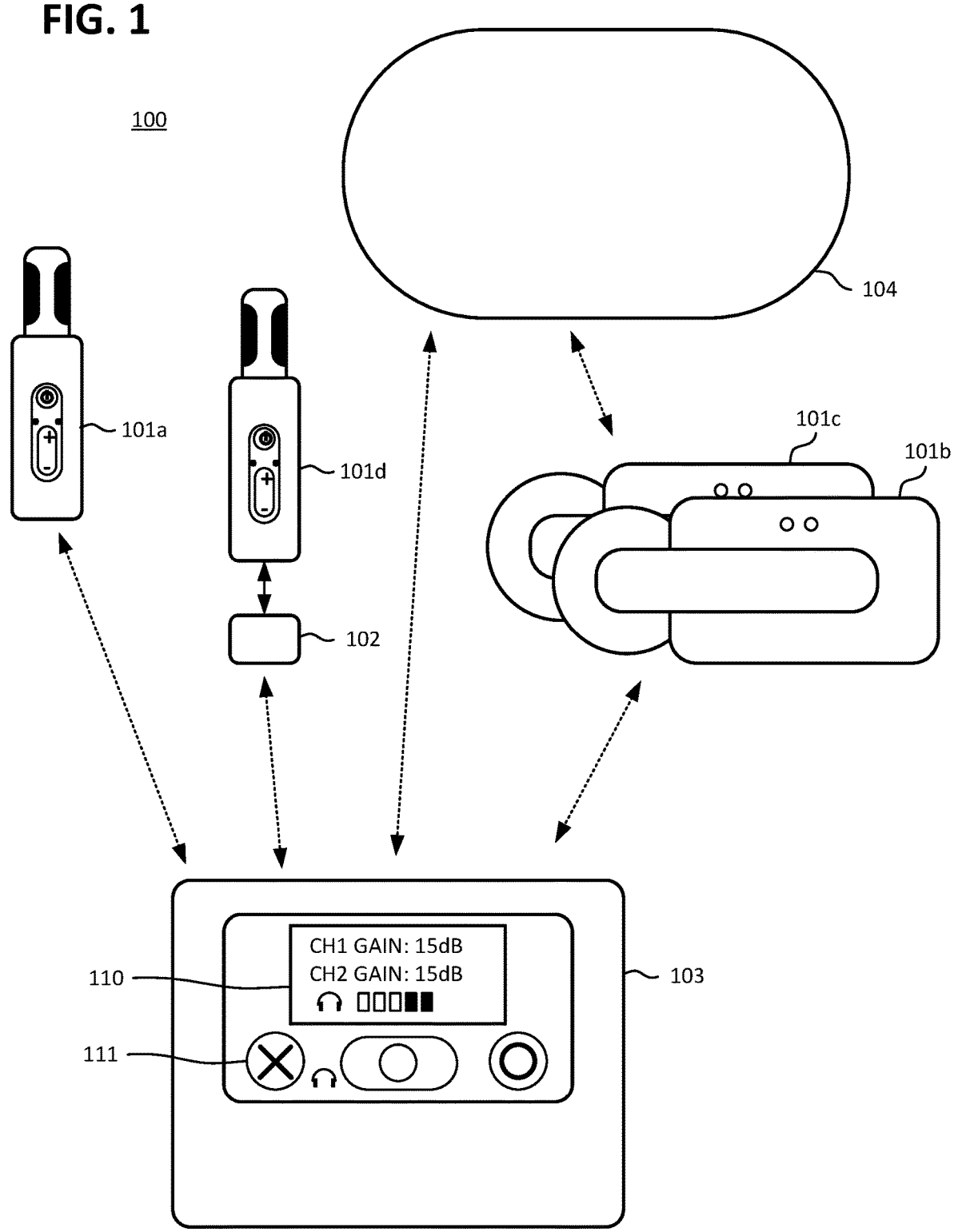
FIG. 1 illustrates an example of a modular wireless microphone system.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example of a modular wireless microphone system 100. In the shown example, the system 100 may include one or more wireless microphones 101, a wireless receiver 103, and/or a charging case 104. The one or more wireless microphones may be of any one or more type(s), such as but not limited to one or more wireless lavalier (lapel) microphones such as microphones 101b and 101c; one or more wireless handheld microphones, one or more wireless shotgun microphones; and/or any other types of wireless microphones. In FIG. 1, microphone 101a represents a wireless microphone of any type, and microphone 101d represents a wired microphone of any type. When the wired microphone 101d is modified with (e.g., connected via wire to) a wireless transceiver 102 as discussed further below, the modified microphone (combination of elements 101d and 102) may be transformed into a wireless microphone. Thus, when referring herein to wireless microphones 101, this is intended to include (for the present example) wireless microphones 101a, 101b, and 101c, as well as the wired microphone 101d when modified by the wireless transceiver 102.

Each of the wireless microphones 101 may be configured to wirelessly communicate with the wireless receiver 103. The wireless communications for each of the wireless microphones 103 may include wirelessly transmitting audio data, to the one or more wireless receivers 103, representing sound detected by the respective one of the microphones 101. For example, the wireless microphone 101a may detect sound, and may generate and wirelessly transmit audio data representing that detected sound to wireless receiver 103. Similarly, the wireless microphones 101*b* and/or 101*c* may each detect sound, and may each generate and wirelessly transmit audio data representing that respective detected sound to wireless receiver 103. More than one of the microphones 101 may simultaneously transmit audio data to the wireless receiver 103. For example, the wireless microphone 101*a* may transmit its audio data to the wireless receiver 103 while the wireless microphone 101*b* may also transmit its audio data to the wireless receiver 103. Where multiple ones of the microphones 101 are simultaneously transmitting audio data to the same wireless receiver 103, the audio data from each of the microphones 101 may be treated by the wireless receiver 103 as a separate channel or track. For example, audio data received from the microphone 101*a* may be treated by the wireless receiver 103 as a left audio channel and audio data received from the microphone 101*b* may be treated by the wireless receiver 103 as a right audio channel. In other examples, a single microphone (such as the microphone 101*a*) may be capable of obtaining sound via two separate audio channels (for example, left and right stereo audio channels) and sending audio data separately representing those two audio channels. Any data transmitted by a microphone to a receiver will be referred to herein as downstream data.

Each of the wireless microphones 101 may include one or more types of microphone elements that implement one or more polar patterns. For example, each of the wireless microphones 101 may include a bidirectional microphone element and/or a cardioid microphone element, and/or may implement a single polar pattern or a plurality of selectable polar patterns.

The downstream data may also include, for example, data indicating a configuration (e.g., status) of the microphone 101 transmitting the downstream data. For example, the downstream data may include data identifying the microphone, indicating a mode of the microphone, indicating one or more capabilities of the microphone, indicating microphone battery status, indicating a measured wireless signal strength, indicating a gain of the microphone, indicating a data protocol to be used for transmitting and/or receiving data, indicating audio data rate, indicating audio codec used, data protocol handshaking information, and/or the like.

The wireless communications may further include upstream data wirelessly transmitted by the wireless receiver 103 to one or more of the microphones 101. The upstream data may include, for example, data identifying the wireless receiver, indicating a mode of the wireless receiver, indicating one or more capabilities of the wireless receiver (for example, supported wireless radio channels, supported codecs, supported data rates, number of simultaneous audio channels supported, etc.), indicating wireless receiver battery status, indicating a measured wireless signal strength, indicating a gain of the wireless receiver, indicating a data protocol to be used, data protocol handshaking information, backchannel (upstream) audio data, and/or the like.

One or more of the microphones 101 may already be wireless-capable, and/or one or more of the microphones 101 may be a wired microphone that is reconfigured to operate as a wireless microphone. For example, if the microphone 101*d* is not itself wireless, a wireless transceiver 102 may be electrically connected to the microphone 101*d* (such as via an XLR connector of the microphone 101*d*) to render it a wireless microphone. The wireless transceiver 102 may be electrically connected, for example, to one or more digital and/or analog signal connectors of the microphone 101*d*.

The wireless receiver 103 may include a display screen 110 and a user interface such as one or more buttons, switches, and/or the like (for example, button 111). The display screen 110 may indicate information to a user, such as a current status of the wireless receiver 103, a current status (e.g., transmission status, connection status, on/off status, battery state) of one or more of the wireless microphones 101, a current status (e.g., signal strength or quality) of a wireless link with one or more of the wireless microphones, a gain being applied, a volume level, an equalization being applied, a codec being used for decoding, a an audio data rate or quality, and/or any other information that is desired. The user interface may allow the user to turn on and off the wireless receiver 103, to connect and disconnect from one or more of the wireless microphones 101, and/or to control any other functionality of the wireless receiver 103 as desired.

The charging case 104 may be configured to hold (for example, enclose) one or more of the other elements of the modular system 100 and to charge their batteries. For example, the charging case 104 may be configured to electrically connect with any one or more of the wireless microphones 101, either simultaneously or one at a time, and to charge rechargeable batteries of the wireless microphones 101. The charging case 103 may further be configured to electrically connect with the wireless receiver 103 to charge the battery of the wireless receiver 103, either simultaneously with the one or more microphones 101 being charged or at a different time. Each of the wireless microphones 101 and the wireless receiver 103 may include one or more electrical contacts, charge ports, and/or other type of electrical connectors configured to be electrically connectable to the charging case 104. The charging case 104 may have a power cord for connecting to an external power source, for example by plugging into a standard wall output, and that external power may be converted and used by the charging case 104 to charge the rechargeable batteries of the wireless microphones 101 and/or the wireless receiver 103. The charging case 104 may also have its own rechargeable battery, which may be charged via the power cord. The rechargeable battery of the charging case 104, once charged, may be used to charge the wireless microphones 101 and/or the wireless receiver 103 even while the charging case 104 is not plugged in to external power via its power cord.

Any of the wireless microphones 101 may include a user interface, such as one or more buttons, switches, touch-sensitive surfaces, and/or the like, for accepting user input. The user input may adjust an operating configuration of the respective wireless microphone 101, such as to turn the wireless microphone on or off, to adjust a gain of the wireless microphone, to adjust a microphone's polar pattern, to connect to a particular wireless receiver, and/or the like.

Figure 2:
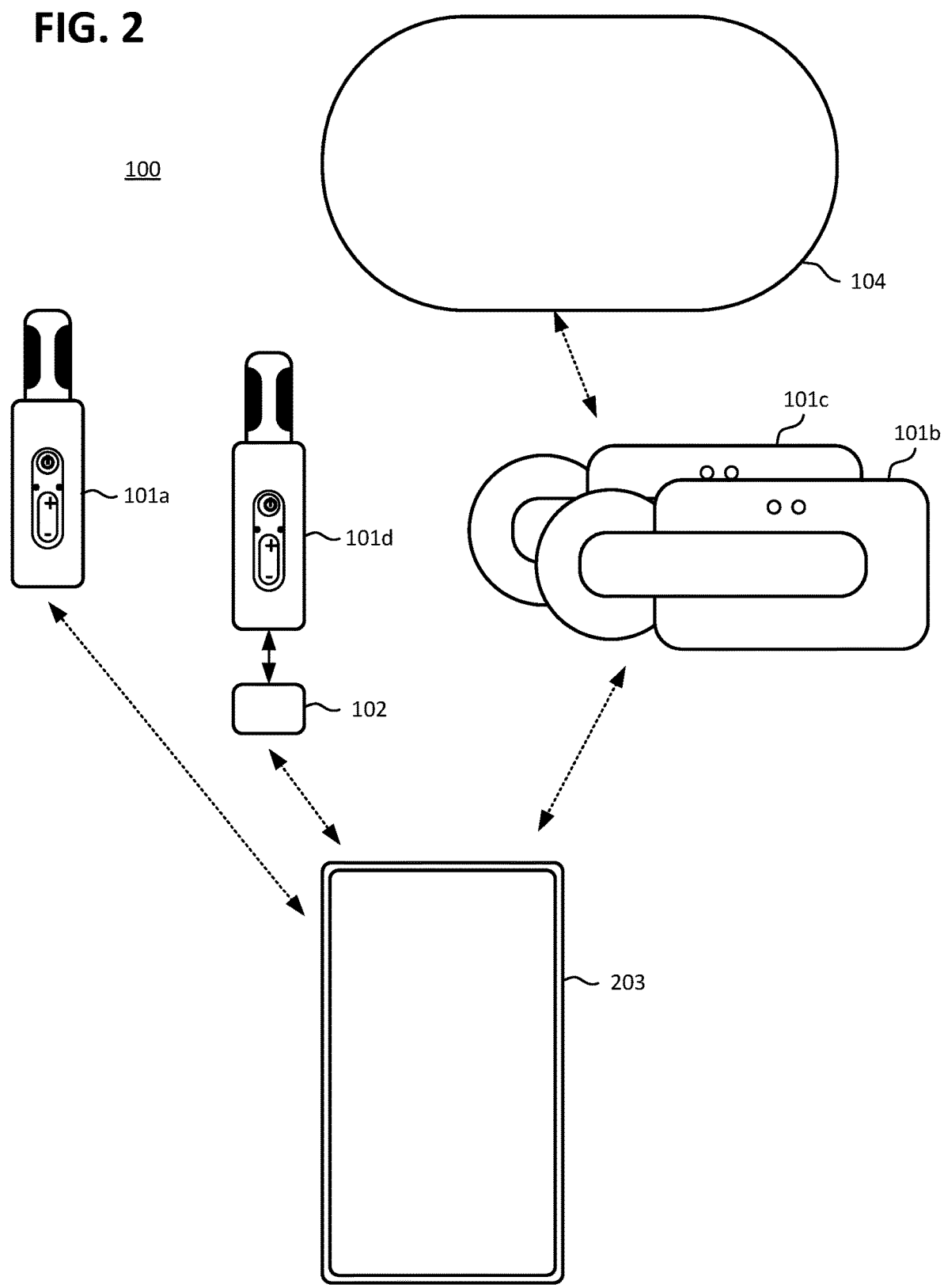
FIG. 2 illustrates another example of a modular wireless microphone system.

FIG. 2 shows another configuration of the modular wireless microphone system 100, which may be identical to the modular wireless microphone system 100 configuration shown in FIG. 1 except that a user device such as a smart phone is used as a wireless receiver 203, rather than the wireless receiver 103. Thus, in the shown example of FIG. 2, one or more of the wireless microphones 101 may directly wirelessly communicate with the user device that functions as the wireless receiver 203 (for example, a smart phone), without needing a wireless communications go-between such as a purpose-built wireless receiver (for example, the wireless receiver 103). The modular nature of the modular wireless microphone system 100 may allow the wireless receiver (implemented using a smart phone or other user device) 203, the wireless receiver 103, and other another compatible wireless receiver to be interchangeably used with the same microphones 100. Not only may the particular wireless receiver be interchangeable in the modular wireless microphone system 100, but any of the elements of the modular wireless microphone system 100 may be interchangeable, added, and removed, thereby providing the user with a flexible modular system experience. For example, at one given time, the modular wireless microphone system 100 may use (for example, receive audio data from) one active subset of the microphones 100 (e.g., microphones 101b and 101c), and at another given time, the modular wireless microphone system 100 may be reconfigured to use a different active subset of the microphones 100 (e.g., microphone 101a), and at yet another given time, the modular wireless microphone system 100 may again be reconfigured to use yet a different active subset of the microphones 100 (e.g., microphone 101a and microphone 101b). In yet another example configuration, the modular wireless microphone system 100 may use any or all of the microphones 101a, 101b, and 101c, and/or still further wireless microphones 101 (and/or microphone types) not explicitly shown in FIGS. 1 and 2, for transmitting audio data to the wireless receiver 103 or 203. Moreover, for any of these various configurations of the modular wireless microphone system 100, any selected type of wireless receiver may be used in combination with the selected microphones 101, such as the wireless receiver 103 or the wireless receiver 203.

The user device that may implement the wireless receiver 203 may be, for example, a smart phone, a table computer, a laptop computer, and/or any other user device capable of wirelessly communicating with the one or more microphones 101. The user device may be configured, such as with executable software, to perform the appropriate wireless communications protocols directly with the one or more microphones 101 and to present an interactive user interface (such as via a display screen of the user device) that may allow a user to view similar information as displayed by the wireless receiver 103 and/or to control functionality in of the user device in a similar way as described herein for the wireless receiver 103.

In any of the various configurations of the modular wireless microphone system 100, any of the wireless microphones 101 and the wireless receiver 103 or 203 may each be configured to wirelessly communicate upstream and/or downstream data using the same one or more data protocols. The data protocols for upstream and downstream data may each include, for example, Classic BLUETOOTH, BLUETOOTH LOW ENERGY (BLE), BLE Audio, a proprietary data protocol, any other standard or non-standard data protocol, and/or any combination of any of the above. A potential advantage of using BLE data protocols is that it may utilize a relatively lower power consumption to wirelessly monitor, transmit, and/or receive data as compared with other wireless data protocols. The same data protocol may always be used for all types of wireless data communications between the wireless microphones 101 and the wireless receiver 103/203, or the data protocol may be switched between two or more different data protocols depending upon a mode of operation of any of the elements of the modular system 100. To transmit audio data via a data protocol, the wireless microphones 101 and/or the wireless receiver 103/203 may embed (for example, encapsulate) the audio data as data packets, frames, and/or other types of protocol data units (PDUs) of a first data protocol within PDUs of a second data protocol. For example, where the second data protocol is BLE, each of the wireless microphones 101 and the wireless receiver 103/203 may be configured to transmit data (e.g., audio data and/or control data) by encapsulating PDUs of the first data protocol within BLE Link Layer packets, and/or to receive the data (e.g., the audio data) by retrieving and reading the so-encapsulated PDUs. The encapsulated audio data packets may be of any standard or non-standard data protocol. As used herein, the term data "packets" will be understood to also include data "frames" as well as any other logical grouping of data that may be used by the relevant data protocol being used to represent the audio data.

Figure 3:
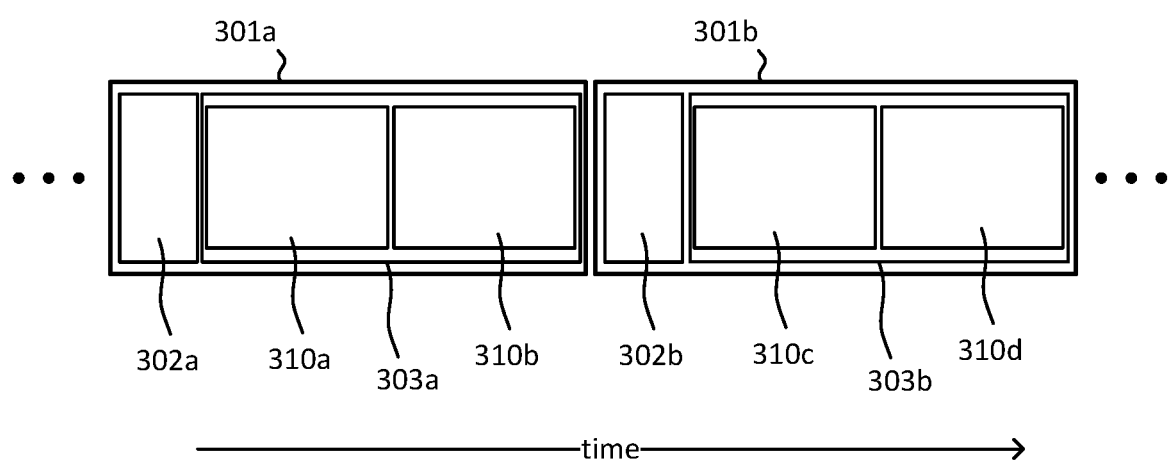
FIG. 3 illustrates an example of how data may be wirelessly transmitted as downstream data and/or as upstream data.

FIG. 3 shows an example of how data may be wirelessly transmitted as downstream data and/or as upstream data. The data being transmitted may include, for example, audio data and/or any of the other types of data described herein. In the shown example, a data stream (downstream or upstream) may include a plurality of PDUs 301 (for example, 301a, 301b, etc.). Each of the PDUs 301 may be PDUs of the above-mentioned second data protocol. For example, the PDUs 301 may be BLE Link Layer packets. Each PDU 301 may comprise a header 302 (for example, headers 302a and 302b) and a payload 303 (for example, payloads 303a and 303b). The headers 302 may include, for example, identifying information such as a source device (e.g., source address or other identifier of the wireless microphone 101 that is wirelessly transmitting the audio data embedded in the associated PDU 301) and destination device (e.g., destination address) for each PDU 301, timing information such as a timestamp, information associated with the payloads 303 such as payload length and/or type and/or PDU 301 length and/or type, CRC (cyclic redundancy check), header, and/or any other information specific to the particular second data protocol. The payloads 303 may include, for example, any other data that is desired to be transferred between devices. For example, the payloads 303 may each include audio data, commands, timestamps, and/or other data desired to be transferred between devices. At least some of the data in the payloads 303 may be included in one or more PDUs 310 of the first data protocol (e.g., PDUs 310a, 310b, 310c, and 310d). For example, any of the wireless microphones may generate, as downstream data, one or more of the PDUs 310 containing audio data (and/or other data), encapsulate or otherwise place one or more of those PDUs 310 into a PDU 301 (for example, encapsulate PDUs 310a and 310b into PDU 301a), and transmit the one or more PDUs 301 to the wireless receiver 203 or 303. The wireless receiver 103 or 203 may, in turn de-encapsulate or otherwise extract the PDUs 310 from the received PDUs 301, extract the audio data from the received PDUs 301, and interpret the audio data (or other data) therein. The same process may be used for upstream data. The audio data may be formatted within the PDUs 301, and/or different types of PDUs 301 may be used, depending upon which wireless receiver (and/or which type of wireless receiver) the wireless microphone 101 is sending the audio data to. For example, if the wireless microphone 101 is connected via BLE to the wireless receiver 103, which may be of a first type of wireless receiver such as a dedicated wireless audio receiver, then the wireless microphone 101 may send the audio data to the wireless receiver 103 using a first format and/or encapsulated within a first type of PDU. If that same wireless microphone 101 is instead connected via BLE to the wireless receiver 203, which may be of a second type of wireless receiver such as a smart phone, then the wireless microphone 101 may send that audio data to the wireless receiver 303 using a second format (different from the first format) and/or encapsulated within a second type of PDU (different from the first type of PDU).

Any of the PDUs of the first data protocol and/or of the second data protocol (e.g., PDUs 301 and/or 310) may be of any length, data rate, PDU rate, and format as desired. The lengths and rates of a series of PDUs may be of a predetermined static length or rate, or may vary from PDU to PDU.

In addition to transmitting the audio data, the wireless microphones may wirelessly transmit other types of data. For example, each of the wireless microphones 101 may transmit an indication of a configuration of the wireless microphone 101, such as a microphone mode, a microphone identity, a desired audio data rate or quality, a codec to be used for encoding and/or decoding audio data, a data protocol to be used for transmitting audio data, and/or the like.

Each wireless microphone 101 may have a wireless connection channel (such as a BLE connection) with the wireless receiver 103 or 203. Where the connection channel is a BLE connection, the BLE connection may have a particular BLE Generic Attribute Profile (GATT) service with one or more data characteristics for its forward channel audio, which may encapsulate the encoded audio frames. Moreover, the wireless connection may transport one or more audio streams from the wireless microphone 101, wherein the audio stream(s) may each have one or more audio channels, such as a mono audio stream or a stereo audio stream, to the wireless receiver 103 or 203. The wireless microphone 101 and/or the wireless receive 103/203 may configure the stream as desired, such as configuring the stream as a left audio channel, a right audio channel, another type of mono audio channel, or as stereo audio.

As an example of the flow of audio data from a wireless microphone 101 to a wireless receiver 103 or 203, a wireless microphone 101 such as the wireless microphone 101a may receive sound via its microphone element, and may convert an analog signal from the microphone element into a digital audio signal using an analog-to-digital (A/D) converter. Or, if the wireless microphone 101a is, for example, a pulse density modulation PDM) microphone, then the wireless microphone 101a may generate a digital audio signal without the need for analog-to-digital conversion. The wireless microphone 101 may transport the digital audio signal, such as via an I2S bus, to a digital signal processing unit, which may apply one or more desired digital signal processing functions (such as equalization, gain adjustment, etc.). Additionally or alternatively, the wireless microphone 101 may transport the digital audio signal to the digital signal processing unit, for example, via a TDM bus. The resulting processed digital audio signal may be encoded using a CODEC, for example an OPUS CODEC. Then the encoded audio signal may be packaged into one or more PDUs (such as BLE Link Layer packets) and timestamped, modulated to radio frequency, and transmitted via an antenna of the wireless microphone 101a. On the receive side, the PDUs may be wireless received by an antenna of the wireless receiver 103 or 203, demodulated from radio frequency, decoded (such as using an OPUS CODEC), de-packetized, and processed. The decoding may result in, for example, pulse-code modulated (PCM) audio data, which may be added to an accumulation buffer based on the timestamp of each received PDU. An asynchronous process at the wireless receiver 103 or 203 may extract the PCM audio data from the buffer in response to the buffer containing a sufficient amount (e.g., at least a threshold amount) of PCM audio data. Where the wireless receiver 203 is a user device such as a smart phone with an existing operating system or other platform, and the process is implemented via software instructions executing over the operating system or other platform (such as a software application), the software instructions may package the PCM audio data into a format suitable for the operating system or other platform and passed to the operating system or other platform for further processing as desired.

FIGS. 4-11 illustrate various example configurations of the modular wireless microphone system 100. An aspect of the present disclosure envisioned herein is that the modular wireless microphone system 100 may be reconfigurable to connect one or more of the microphone 101 in myriad ways with one or more types of other devices such as wireless receivers 103 or 203, computers, mixers, cameras, and/or audio headsets. As such, the illustrated configurations are merely examples; there are many other possible configurations (for example, interconnections) of various elements of the modular wireless microphone system 100.

For example, the various elements of the modular wireless microphone system 100 may be compatible to communicate with each other in various combinations, which may in turn allow the modular wireless microphone system 100 to flexibly accommodate the particular needs of the user in a particular situation. Moreover, the modular wireless microphone system, 100 may be scaled as needed, from one wireless microphone to as many simultaneous/parallel wireless microphones as needed to provide as many audio channels as needed. For example, if the user requires two or more audio channels, the user may wirelessly (or via wire) connect two or more of the wireless microphones 101 to another device that is capable of receiving the audio channels from the wireless microphones 101. If the user requires only a single audio channel, then the user may utilize only a single one of the wireless microphones 101. If the other device is directly compatible with the wireless microphones 101, then the user may directly connect (wireless or via wire) the wireless microphones 101 to the other device. If the other device is not directly compatible with the wireless microphones 101 (for example, the other device is not compatible with the wireless audio protocol transmitted by the wireless microphones 101), then the user may connect the wireless receiver 103 (or 203) between the one or more wireless microphones 101 and the other device, and the wireless receiver 103 (or 203) may perform the necessary signal and format conversions to receive audio from the wireless microphones 101 and send the audio to the other device.

Figure 4A:
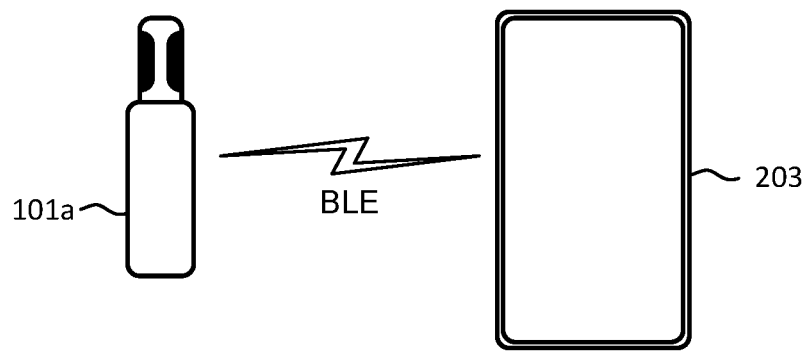
FIGS. 4A, 4B, 5A, 5B, 6A, 6B, 7A, 7B, 8A, 8B, 9A, 9B, 10A, 10B, 10C, 11A, and 11B illustrate various example configurations of the modular wireless microphone system 100.
Figure 4B:
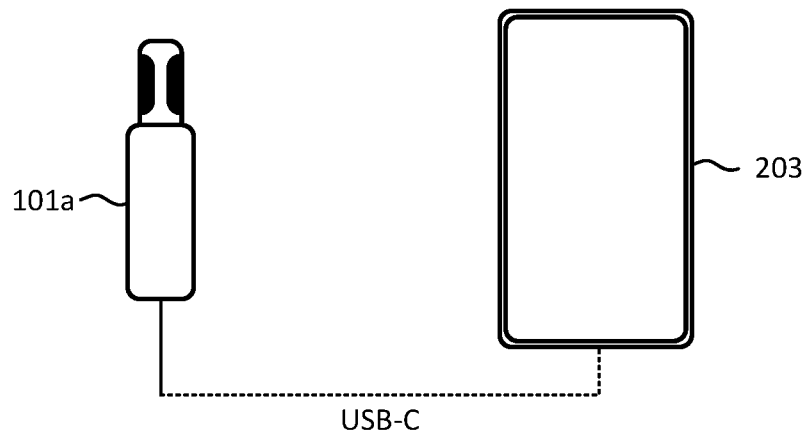

FIGS. 4A and 4B show two example configurations of the modular wireless microphone system 100. In the FIG. 4A configuration, one of the wireless microphones (for example, the wireless microphone 101a) is transmitting audio via a wireless connection, such as BLE encapsulating another data protocol, to the wireless receiver 203. In the FIG. 4B configuration, one of the wireless microphones (for example, the wireless microphone 101a) is transmitting audio via a wired connection, such as USB (for example, USB-C), to the wireless receiver 203. Alternatively, the wireless receiver 103 may replace the wireless receiver 203. The wireless receiver 203 (or 103) may also transmit upstream data to the wireless microphone 101a via a wireless connection (for example, the BLE data connection) or via the wired connection (for example, the USB-C connection). The configurations of FIGS. 4A and 4B may be useful, for example, for transmitting only a single channel of audio from a single microphone.

Figure 5A:
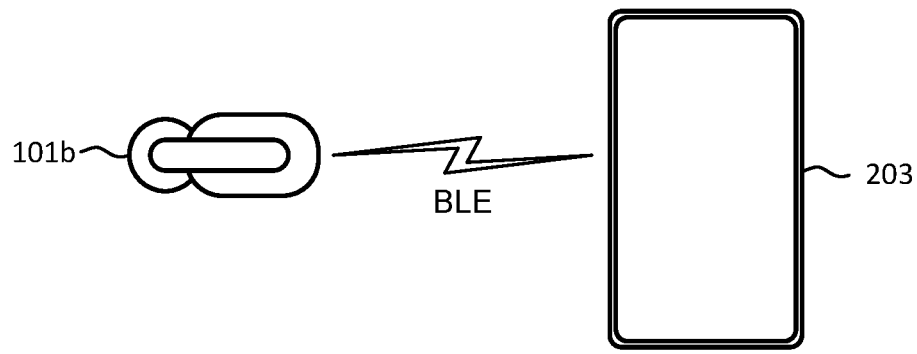
Figure 5B:
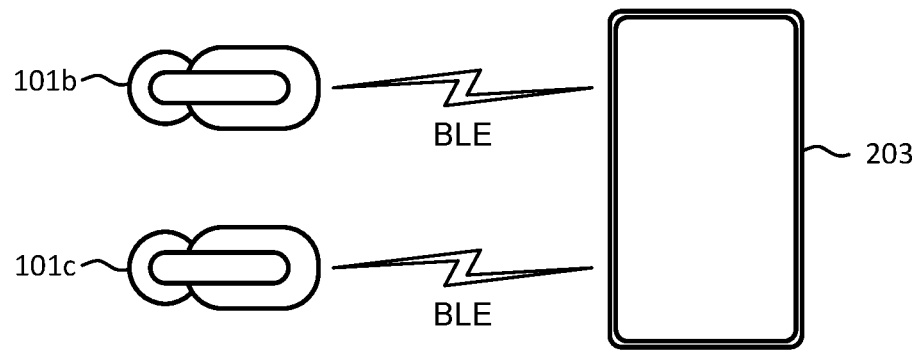

FIGS. 5A and 5B show another two example configurations of the modular wireless microphone system 100. In the FIG. 5A configuration, a different one of the wireless microphones (for example, the wireless microphone 101*b*) is wirelessly communicating with the wireless receiver 203. In the FIG. 5B configuration, a plurality of the wireless microphones (for example, the two wireless microphones 101*b* and 101*c*) are simultaneously wirelessly communicating with the wireless receiver 203. In both configurations, the wireless connections may each be, for example, BLE encapsulating another data protocol. In both configurations of FIGS. 5A and 5B, the wireless receiver 203 may instead be replaced with the wireless receiver 103. In the configuration with two wireless microphones, one of the wireless microphones (for example, the wireless microphone 101*b*) may transmit audio data that is interpreted and treated by the wireless receiver 203 as a first (for example, left) audio channel, and the other of the wireless microphones (for example, the wireless microphone 101*c*) may transmit audio data that is interpreted and treated by the wireless receiver 203 as a second (for example, right) audio channel. These example configurations may be useful, for example, for transmitting one channel (FIG. 5A), or multiple simultaneous (parallel) channels (FIG. 5B) of audio. In the FIG. 5B configuration, the wireless receiver 203 (or 103) may have a single set of wireless receiver circuitry that is configured to demultiplex the wirelessly received audio data from the plurality of microphones (for example, the audio data that is simultaneously wirelessly received from the microphones 101*b* and 101*c*). The wireless receiver 203 (or 103) may further be configured to mix the two audio channels in a desired manner and to produce a digital or analog signal representing the mixed audio channels.

Figure 6A:
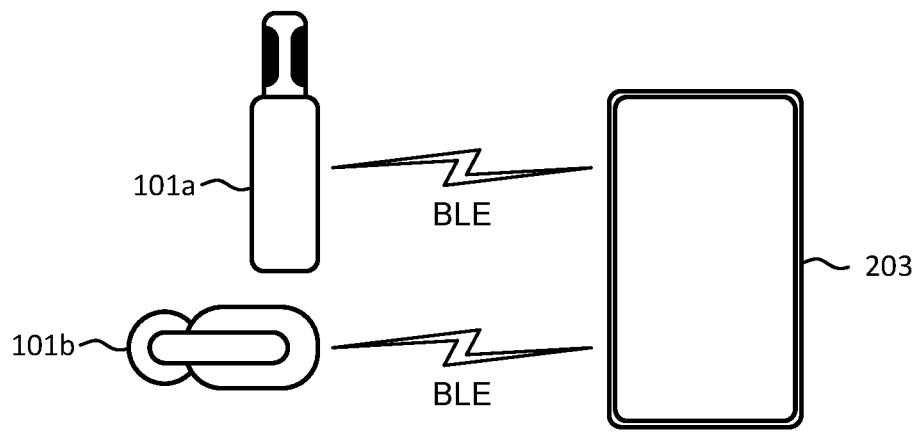
Figure 6B:
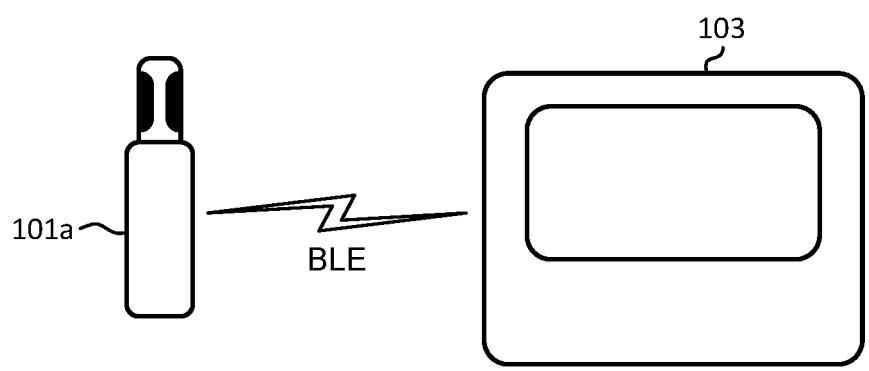

FIGS. 6A and 6B show two further example configurations of the modular wireless microphone system 100. In the FIG. 6A configuration, a different plurality of the wireless microphones (for example, the two wireless microphones 101*a* and 101*b*) are simultaneously wirelessly communicating with the wireless receiver 203. In the FIG. 6B configuration, a different one of the wireless microphones (for example, the wireless microphone 101*a*) is wirelessly communicating with the wireless receiver 103. In both configurations of FIGS. 6A and 6B, the wireless connections may each be, for example, BLE encapsulating another data protocol. In both configurations, the wireless receiver 203 may instead be replaced with the wireless receiver 103. In the configuration with two wireless microphones, one of the wireless microphones (for example, the wireless microphone 101*a*) may transmit audio data that is interpreted and treated by the wireless receiver 203 as a first (for example, left) audio channel, and the other of the wireless microphones (for example, the wireless microphone 101*b*) may transmit audio data that is interpreted and treated by the wireless receiver 203 as a second (for example, right) audio channel. The example configurations of FIG. 6 may be useful, for example, for transmitting one channel of audio (FIG. 6B), or multiple simultaneous (parallel) channels of audio (FIG. 6A).

Figure 7A:
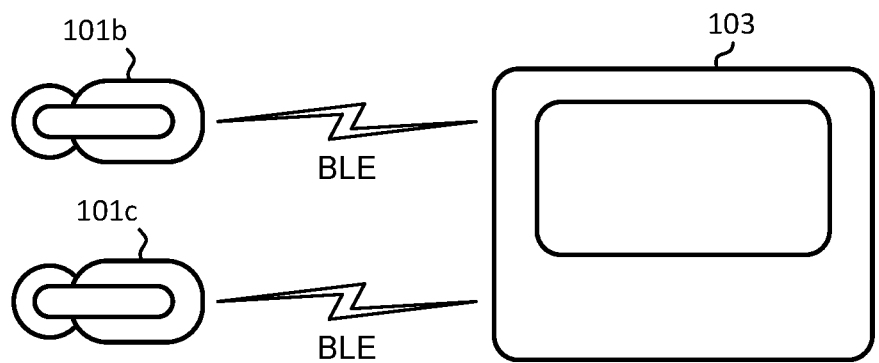
Figure 7B:
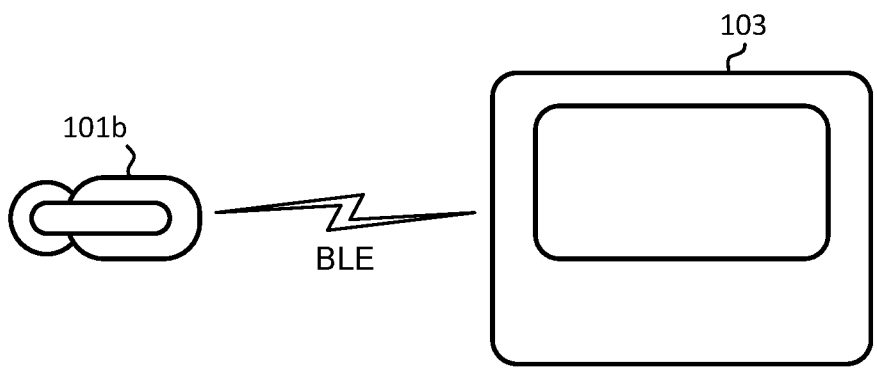

FIGS. 7A and 7B show two further example configurations of the modular wireless microphone system 100. In the FIG. 7A configuration, a different plurality of the wireless microphones (for example, the two wireless microphones 101*b* and 101*c*) are simultaneously wirelessly communicating with the wireless receiver 103. In the FIG. 7B configuration, one of the wireless microphones (for example, the wireless microphone 101*b*) is wirelessly communicating with the wireless receiver 103. In both configurations of FIGS. 7A and 7B, the wireless connections may each be, for example, BLE encapsulating another data protocol. In both configurations, the wireless receiver 103 may instead be replaced with the wireless receiver 203. In the configuration with two wireless microphones, one of the wireless microphones (for example, the wireless microphone 101*b*) may transmit audio data that is interpreted and treated by the wireless receiver 103 as a first (for example, left) audio channel, and the other of the wireless microphones (for example, the wireless microphone 101*c*) may transmit audio data that is interpreted and treated by the wireless receiver 103 as a second (for example, right) audio channel. These example configurations may be useful, for example, for transmitting one channel of audio (FIG. 7B), or multiple simultaneous (parallel) channels of audio (FIG. 7A).

Figure 8A:
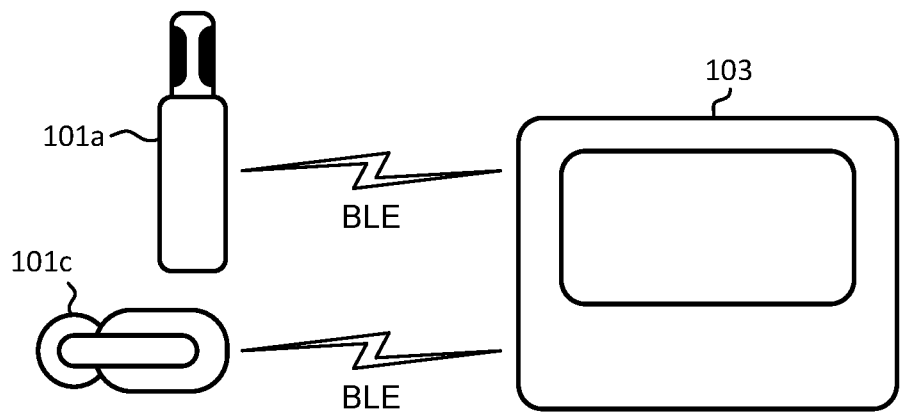
Figure 8B:
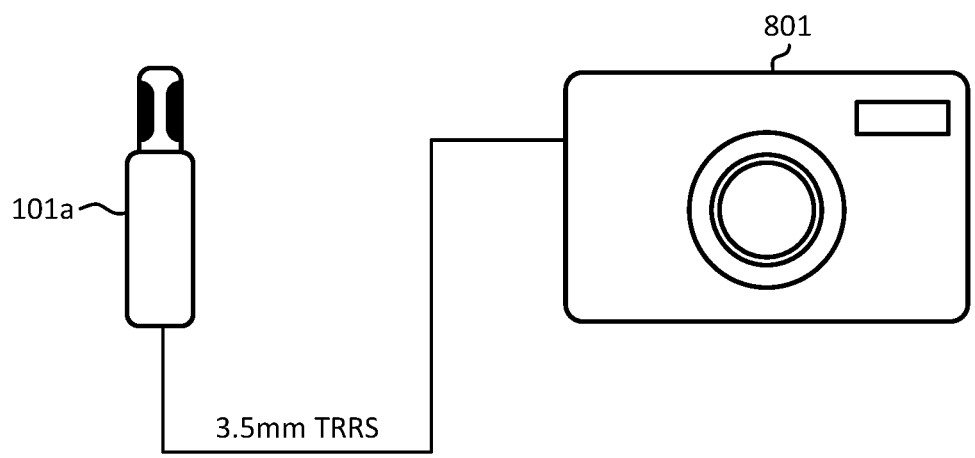

FIGS. 8A and 8B show two further example configurations of the modular wireless microphone system 100. In FIG. 8A, a different plurality of the wireless microphones (for example, the two wireless microphones 101*a* and 101*c*) are simultaneously wirelessly communicating with the wireless receiver 103. The wireless connections may each be, for example, BLE encapsulating another data protocol. Also, the wireless receiver 103 may instead be replaced with the wireless receiver 203. One of the wireless microphones (for example, the wireless microphone 101*a*) may transmit audio data that is interpreted and treated by the wireless receiver 103 as a first (for example, left) audio channel, and the other of the wireless microphones (for example, the wireless microphone 101*c*) may transmit audio data that is interpreted and treated by the wireless receiver 103 as a second (for example, right) audio channel. The FIG. 8A configuration may be useful, for example, for transmitting multiple simultaneous (parallel) channels of audio.

The FIG. 8B configuration shows a wireless microphone (for example, the wireless microphone 101*a*) connected via a wired connection to another device 801. The wired connection may be, for example, a 3.5 mm TRRS connection, or any other type of connection for transferring analog and/or digital signals. The other device 801 may be any type of device capable of receiving audio from the wireless microphone, and is illustrated by way of example as a camera. However, the device 801 may be, for example, another type of audio or audio/visual device such as a mixer, a wired receiver, a laptop computer, and/or the like. The FIG. 8B may be useful, for example, for transmitting a single channel of audio or multi-channel audio (such as left/right stereo audio) to the device 801. For example, the device 801 may be a video camera and may be recording or otherwise obtaining video whilst associated audio for the video is being received via the microphone 101. The device 801 may synchronize the audio with the video in a desired manner.

Figure 9A:
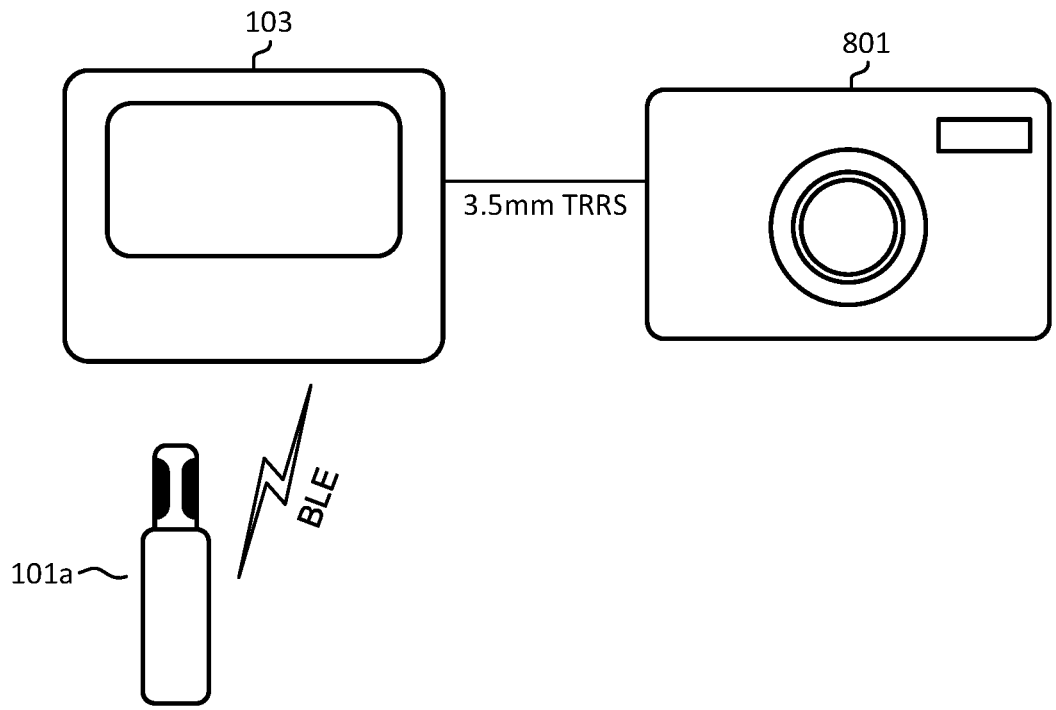
Figure 9B:
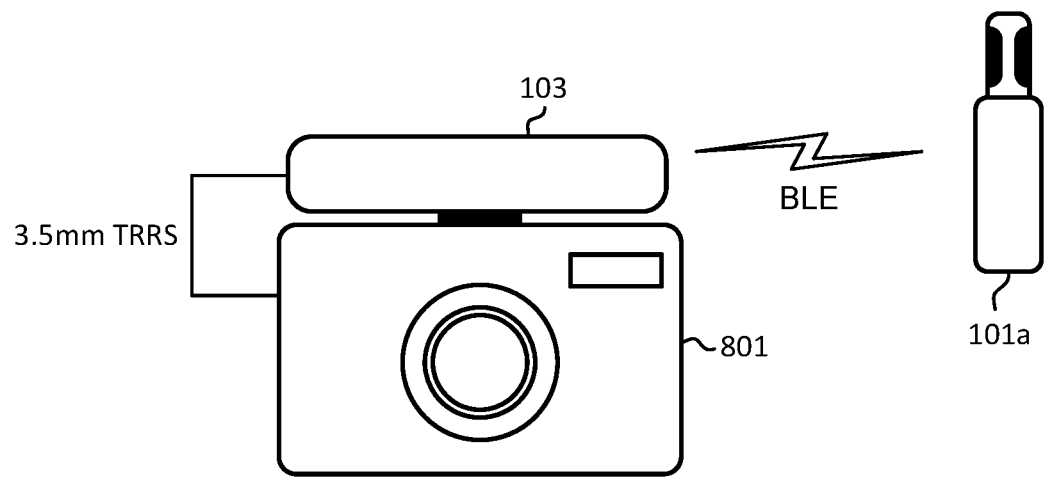

FIGS. 9A and 9B show two further example configurations of the modular wireless microphone system 100. In both example configurations of FIGS. 9A and 9B, the wireless receiver 103 may be connected via a wired connection to another device such as the device 801. The wired connection may be, for example, a 3.5 mm TRRS connection, or any other type of connection for transferring analog and/or digital signals. While the wireless receiver 103 is connected to the device 801, the wireless receiver 103 may also be simultaneously wirelessly receiving audio data from one or more of the microphones 101, such as the microphone 101*a*. The wireless connection between the wireless receiver 103 and the wireless microphone may be, for example, BLE encapsulating another data protocol. The wireless receiver 103 may extract the audio data received via the wireless connection and may forward a signal based on the audio data to the device 801. For example, the wireless receiver 103 may convert the audio data to analog audio signals, which may be sent to the device 801 via the wired connection. As another example, the wireless receiver 103 may send the audio data, or other data derived from the audio data, to the device 801 via the wired connection. This configuration may be useful where the device 801 may not necessarily be compatible with the wireless connection data protocol or where the device 801 does not have wireless communications capability at all.

The FIG. 9B configuration is similar to the FIG. 9A configuration, except that in addition to the wired connection, the wireless receiver 103 may be physically connected to (for example, physically mounted to) the device 801 via a mounting apparatus. The wireless receiver 103 may mount to, for example, a shoe-type mounting apparatus commonly provided with digital cameras. The mounting apparatus may be a "cold" mount (for example, a cold-shoe mount) in which no data and/or no power are transferred via the mounting apparatus between the wireless receiver 103 and the device 801. However, the mounting apparatus may alternatively be a "hot" mount (for example, a hot-shoe mount) that transfers power and/or data between the wireless receiver 103 and the device 801. In the "hot" mount scenario, the audio data may be transferred via the mounting apparatus and thus a separate wired connection (such as the 3.5 mm TRRS connection) may be redundant and not needed. When mounted to the device 801, the wireless receiver 103 may be configured to mount to the device 801 in a low-profile manner, such as by having its own mounting apparatus connection on the back surface of the wireless receiver 103 and/or by being foldable with respect to its mounting connection.

Figure 10A:
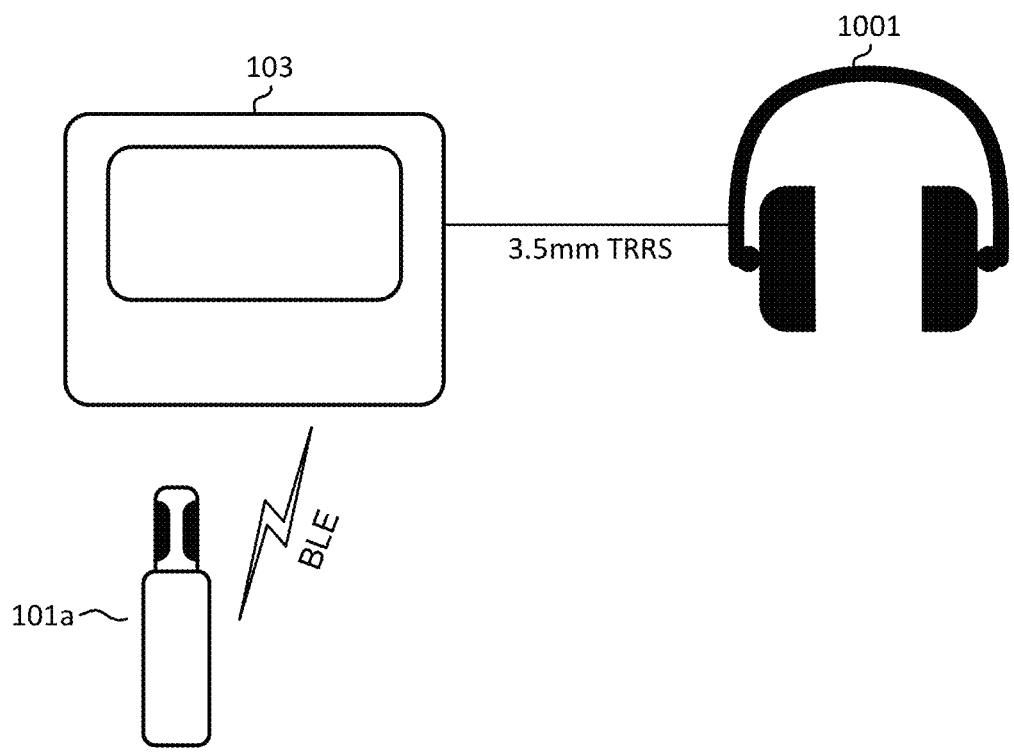
Figure 10B:
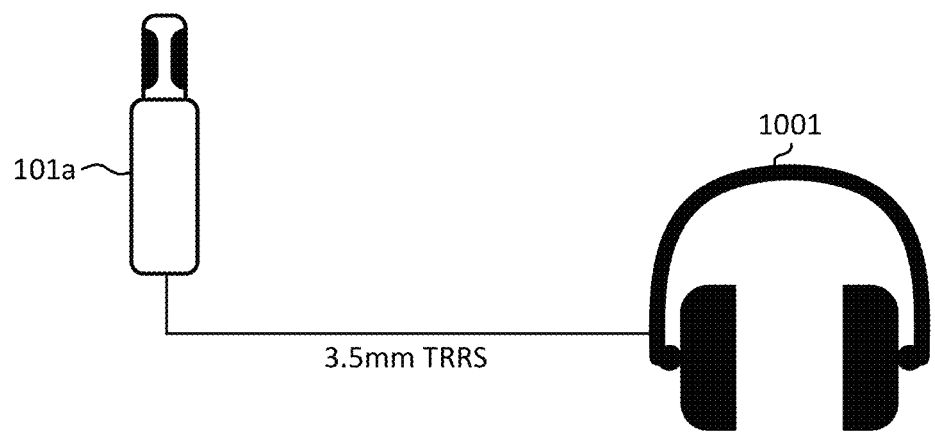
Figure 10C:
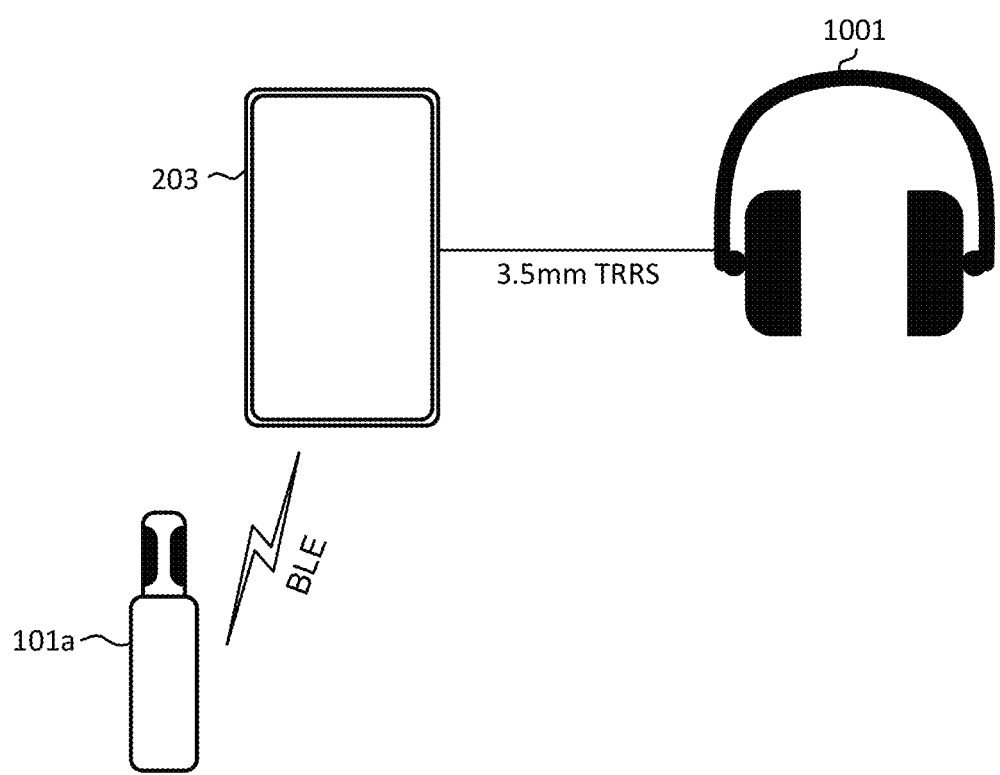

FIGS. 10A, 10B, and 10C show further example configurations of the modular wireless microphone system 100. In the FIGS. 10A and 10C configurations, the wireless receiver 103 or the wireless receiver 203 may be connected via a wired connection to another device such as an audio headset 1001, earphones, or another type of audio-compatible user listening device. The wired connection may be, for example, a 3.5 mm TRRS connection (or other headphone jack type), a lightning connection (which may include an adaptor to connect to the headphones such as a lightning/3.5 m, adapter), or any other type of connection for transferring analog and/or digital signals. Instead of a wired connection between the wireless receiver 103/203 and the audio headset 1001, the connection may be wireless such as via Bluetooth or BLE. While the wireless receiver 103 is connected to the audio headset 1001 (via wire or wirelessly), the wireless receiver 103 may also be simultaneously wirelessly receiving audio data from one or more of the microphones 101, such as the microphone 101a. The wireless connection between the wireless receiver 103 and the wireless microphone may be, for example, BLE encapsulating another data protocol. The wireless receiver 103 may extract the audio data received via the wireless connection and may forward a signal based on the audio data to the audio headset 1001. For example, the wireless receiver 103 may convert the audio data to analog audio signals, which may be sent to the audio headset 1001 via the wired connection. As another example, the wireless receiver 103 may send the audio data, or other data derived from the audio data, to the audio headset 1001 via the wired connection. This configuration may be useful where the audio headset 1001 may not necessarily be compatible with the wireless connection data protocol or where the audio headset 1001 does not have wireless communications capability at all. As another example, the audio headset 1001 may be connected to the wireless receiver 103 via (for example) a 3.5 mm TRRS connection, and a first person wearing the audio headset 1001 at the wireless receiver 103 may be able to talk into a microphone of the audio headset 1001. The first person's voice may be sent to the hardware receiver 103, which may then wireless transmit, via a reverse link (for example, a backchannel) back to the microphone 101a. A second person at the microphone 101a may also have audio headphones plugged into or otherwise in communication with the microphone 101a, and the microphone 101a may send the first person's transmitted voice to the second person's audio headphones. The second person thusly may be able to hear the transmitted audio coming back from the first person at the wireless receiver 103.

In the FIG. 10B configuration, a wireless microphone 101 (for example, the wireless microphone 101a) may be directly connected, via a wired connection, to the audio headset 1001. The wired connection may be, for example, a 3.5 mm TRRS connection, or any other type of connection for transferring analog and/or digital signals. In this example configuration, the wireless microphone 101 may be temporarily functioning as a wired microphone.

Figure 11A:
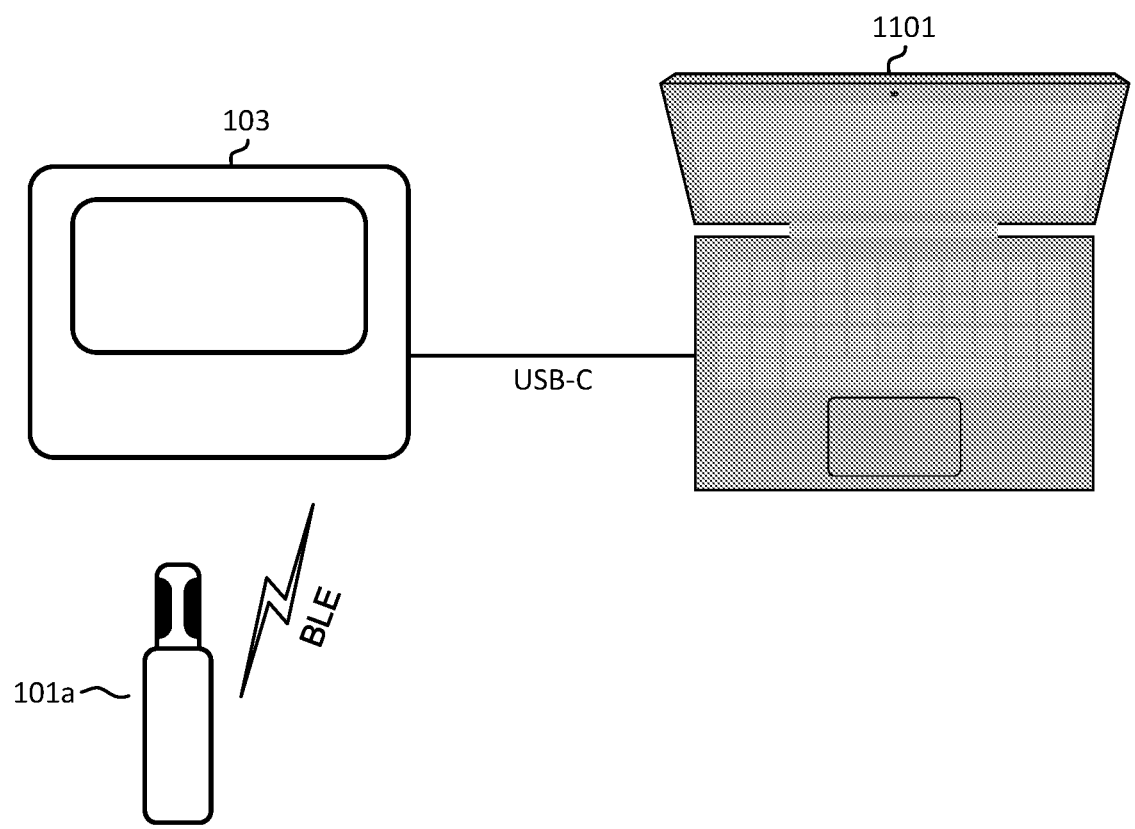
Figure 11B:
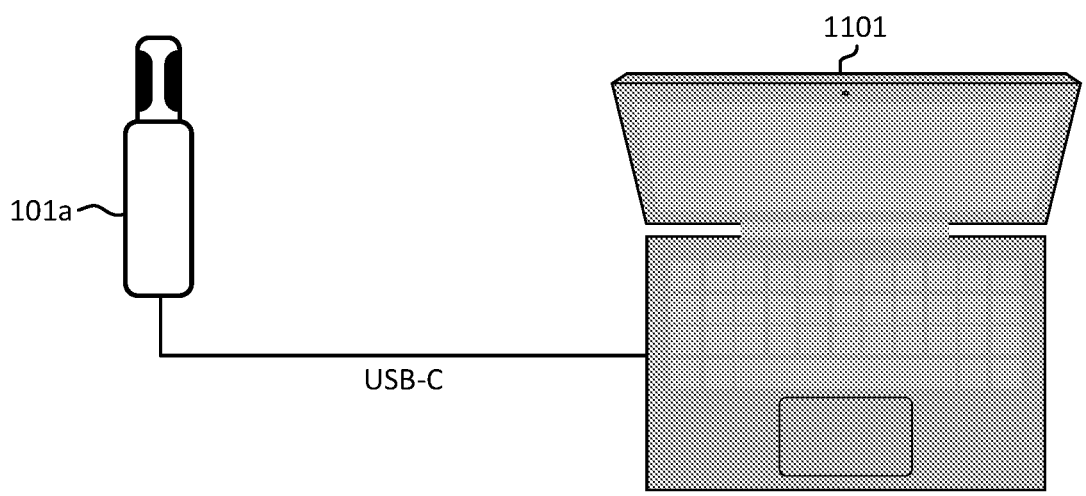

FIGS. 11A and 11B show two further example configurations of the modular wireless microphone system 100. In the FIG. 11A configuration, the wireless receiver 103 may be connected via a wired connection to another device 1101 such as a laptop computer, desktop computer, mixer, or other type of device capable of receiving and/or processing audio signals. For non-limiting illustrative purposes only, it will be assumed in the discussion below that the device 1101 is a laptop computer. The wired connection may be, for example, a USB connection such as a USB-C connection, or any other type of connection for transferring analog and/or digital signals. While the wireless receiver 103 is connected to the laptop computer 1101, the wireless receiver 103 may also be simultaneously wirelessly receiving audio data from one or more of the microphones 101, such as the microphone 101a. The wireless connection between the wireless receiver 103 and the wireless microphone(s) may be, for example, BLE encapsulating another data protocol. The wireless receiver 103 may extract the audio data received via the wireless connection and may forward a signal based on the audio data to the laptop computer 1101. For example, the wireless receiver 103 may send the audio data, or other data derived from the audio data, to the laptop computer 1101 via the USB-C wired connection. As another example, the wireless receiver 103 may convert the audio data to analog audio signals, which may be sent to the laptop computer 1101 via another type of wired connection. This configuration may be useful where the laptop computer 1101 may not necessarily be compatible with the wireless connection data protocol (for example, does not have a BLE communication card) or where the laptop computer 1101 does not have wireless communications capability at all.

In the FIG. 11B configuration, a wireless microphone 101 (for example, the wireless microphone 101a) may be directly connected, via a wired connection, to the laptop computer 1101. The wired connection may be, for example, a USB connection such as a USB-C connection, or any other type of connection for transferring analog and/or digital signals. In this example configuration, the wireless microphone 101 may be temporarily functioning as a wired microphone.

Figure 12:
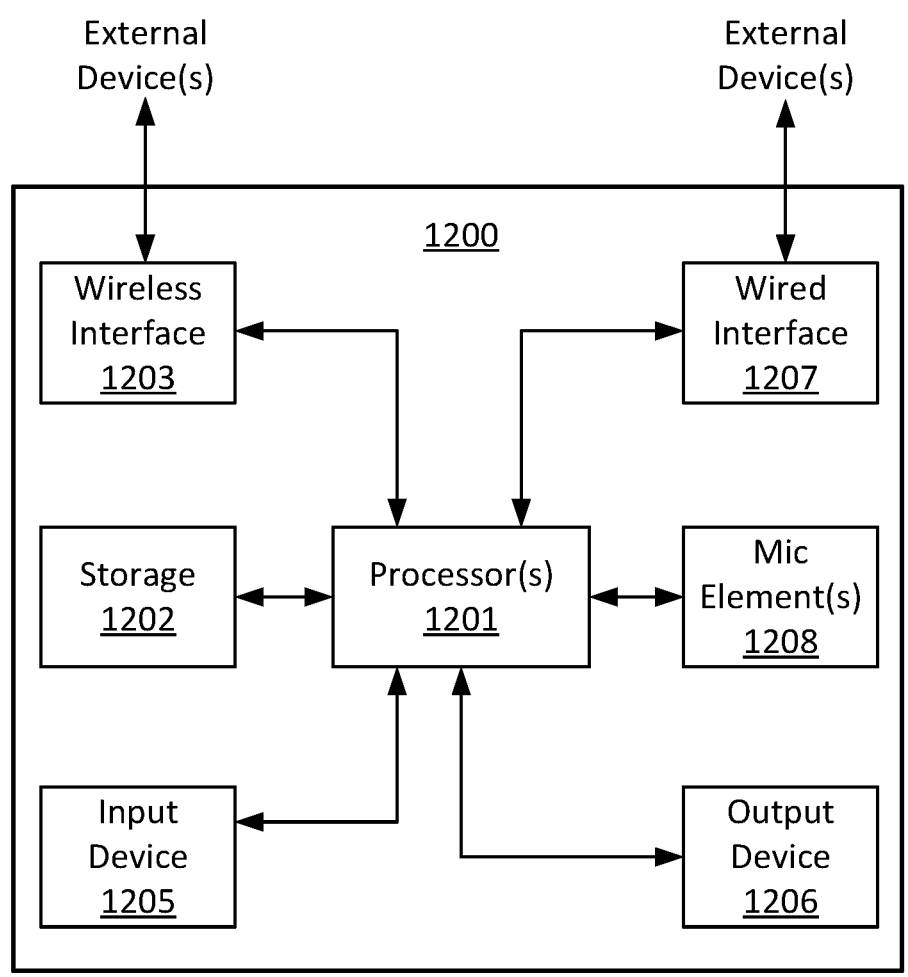
FIG. 12 illustrates an example block diagram of various elements of a modular wireless microphone system.

FIG. 12 shows an example block diagram of any of the elements of the modular wireless microphone system 100. Each of the elements 101, 102, 103, 104, and/or 203 may include or may otherwise be partially or fully implemented as a device such as shown in FIG. 12. The device 1200 may be implemented as, for example, a computing device that executes stored instructions, and/or as hard-wired circuitry that may or may not execute stored instructions. In the shown example, the device 1200 may comprise or be connected to any of the following: one or more processors 1201, storage 1202 (which may comprise one or more computer-readable media such as memory), a wireless interface 1203, a wired interface 1207, an input device 1205, an output device 1206, and/or one or more microphone elements (with respective microphone driver circuitry) 1208.

The one or more processors 1201 may be configured to execute instructions stored in storage 1202. The instructions, when executed by the one or more processors 1201, may cause the device 1200 to perform any of the functionality described herein performed by any of the elements 101, 102, 103, 104, and/or 203 of the modular wireless microphone system 100. For example, the instructions may cause device 1200 to configure the one or more processors 1201 to implement, enable, disable, and/or change device settings such as data transmission settings, microphone polar pattern settings, digital signal processing settings, user interfaces, and/or the like.

The wireless interface 1203 may include or be coupled with one or more antennae, and may transmit and/or receive upstream and/or downstream data such as the data wireless transmitted between one of the wireless microphones 101 and the wireless receiver 103 or 203. The wired interface 1207 may include one or more physical connections for receiving and/or transmitting digital and/or analog signals, such as the above-described USB (e.g., USB-C) connections or other types of connections (e.g., Apple Lightning) and/or the above-described 3.5 mm TRRS connections. Where the wireless interface is part of the wireless receiver 103 or 203, the wireless interface 1203 may include circuitry configured to receive, extract, and demultiplex audio data that is received from a plurality of the wireless microphones 101. For example, if the wireless receiver 103 or 203 is receiving simultaneously from two wireless microphones 101 (such as in the configuration of FIG. 5B), the wireless interface 1203 of the wireless receiver 103 or 203 may be configured to demultiplex the audio data that is wirelessly received over a common transmission medium (for example, the air) shared by the transmissions of both of the wireless microphones 101. Depending upon the data protocol that the wireless microphones 101 use to transmit the audio data, the audio data received and extracted by the wireless receiver 103 or 203 may be attributed to the wireless microphone source 101 via the received data associated with (e.g., identifying) the source wireless microphone that transmitted the audio data.

The input device 1205 and/or the output device 1206 may implement any user interface of the particular element of the modular wireless microphone system 100. For example, the buttons of the microphone 101a may correspond to the input device 1205, and the display screen of the wireless receiver 103 or 203 may correspond to the output device 1206.

Power may be provided to any of elements of the device 1200 as appropriate or needed. While not explicitly shown, the device 1200 may include an internal power source (such as a battery) and/or a power connection for receiving an external power source.

FIGS. 13A-13C shows example details of the charging case 104. FIGS. 13A and 13B show the charging case 104 from a top point of view with a lid 1301 removed. FIG. 13C shows the charging case 104 from a side point of view with the lid 1301 in place and closed.

Referring to FIG. 13A, the charging case 104 may include a body (for example, a housing) 1302 (which may be made of, for example, plastic). The body 1302 may include an interior portion that includes one, two, or more depressions 1303 (such as 1303a and 1303b) into which one, two, or more of the microphones 101 may fit and lay at least partially within. The depressions 1303 may have a shape associated with the wireless microphone 101 that is to lay within it. For example, each depression 1303 may have a shape that is confirmed to the outer shape of at least a portion of the wireless microphone 101 that is to lay within it. Each of the depressions 1303 may further include one, two, or more electrical contacts 1304 (such as contact pair 1304a and contact pair 1304b) configured to be in electrical contact with one, two, or more corresponding electrical contacts of the wireless microphones 101 that are to lay within the depressions 1303. The charging case 104 may also include one or more magnets positioned, shaped, and/or otherwise configured to hold the wireless microphones 101 in place while they are being charged. The magnets may be located within the depressions 1303, integrated with the electrical contacts 1304, and/or otherwise arranged as desired to interface with one or more magnets or magnetic materials of the wireless microphones 101 when they are being charged in the charging case 1404.

FIG. 13B is similar to FIG. 13A, except that two of the wireless microphones 101 (in this example, wireless microphones 101b and 101c) are laying within respective depressions 1303a and 1303b such that their electrical contacts are electrically connected to the electrical contacts 1304. In such a configuration, the wireless microphones 101b and 101c may be simultaneously charged by the charging case 104.

FIG. 13C shows a side view of the charging case 104 with the lid 1301 closed onto the body 1302 such that the interior portion is enclosed by the body 1302 and the lid 1301. The lid 1301 may also be considered part of the body 1302. The lid 1301 may have a hinge on one side that allows the lid 1301 to pivot between an open position (for inserting or removing the wireless microphones 101) and the closed position. Alternatively, the lid may be set in place with a friction fit to the body 1302, and entirely removed as needed, without a hinge. In addition, FIG. 13C shows that the wireless receiver 103 may also be electrically connected to the charging case 104 so that it may be charged simultaneously with the wireless microphones 101b and 101c if so desired. In this example, the wireless receiver 103 may have one, two, or more electrical contacts that may electrically connect with one, two, or more electrical contacts on an exterior (for example, bottom) surface of the charging case 104, and may be charged simultaneously with the charging of one or more of the microphones by the charging case 104. The wireless receiver 103 and/or the charging case 104 may have one or more physical connectors (which may parts of the electrical connectors) that physically hold (e.g., mount) the wireless receiver 103 to the charging case 104 during charging.

Figure 14:
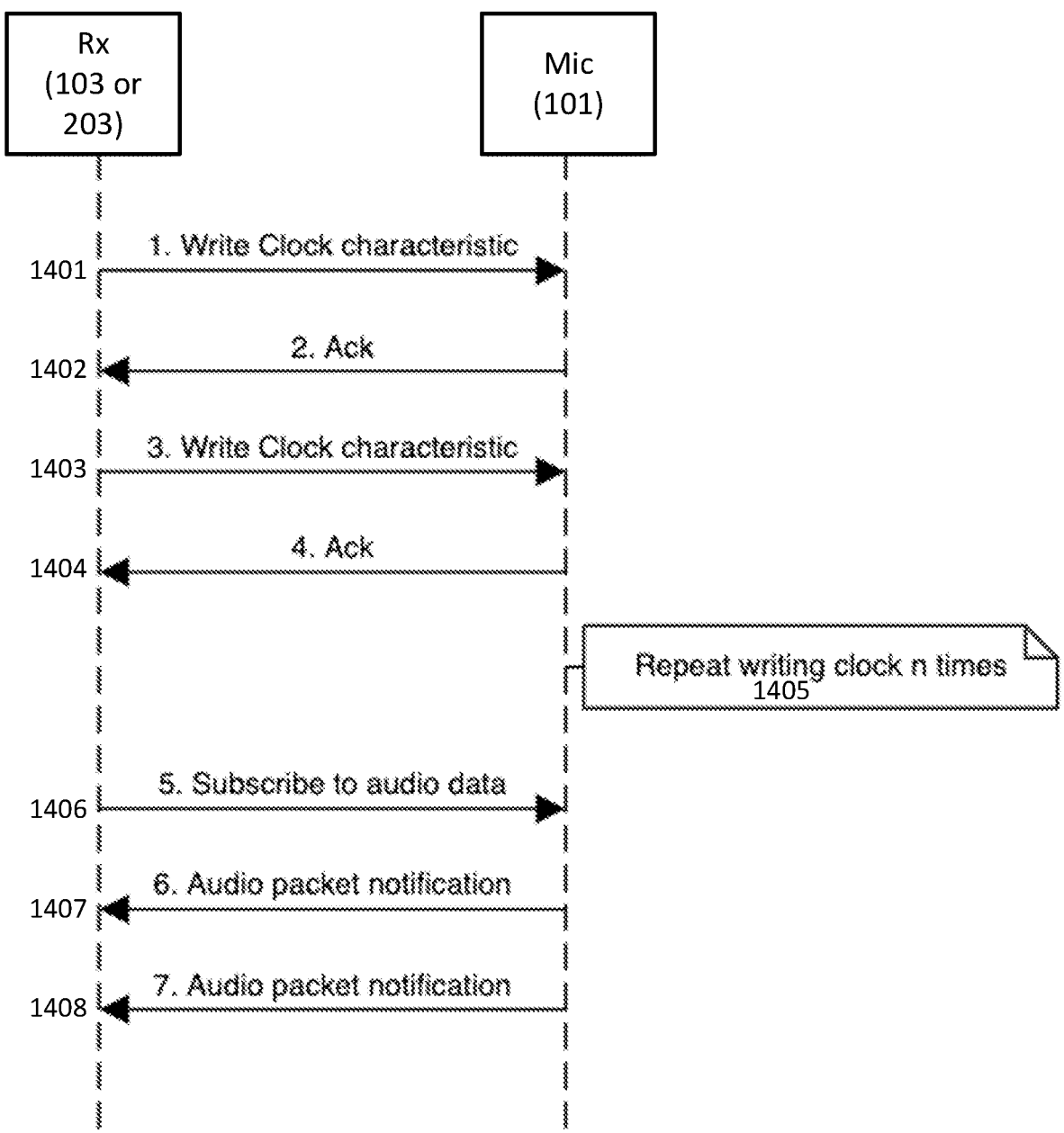
FIG. 14 is a flowchart showing an example process for synchronizing audio data transmitted by a wireless microphone to a wireless receiver.

FIG. 14 is a flowchart showing an example process for synchronizing audio data transmitted by one of the wireless microphones 101 to the wireless receiver 103 or 203 and for establishing a connection between the wireless microphone 101 and the wireless receiver 103 or 203. Each of the wireless microphones 101, and the wireless receiver 103 or 203, may run its own local clock. Each of the wireless microphones 101 may include a timestamp, based on its local clock, in one or more of the PDUs 301 (such as in the headers 302) or 310. However, the various local clocks of the various devices may not necessarily be synchronized with one another. In fact, it is highly likely that they would not be without purposefully synchronizing them. Thus, if an audio data packet (for example a BLE Link Layer packet) transmitted by a wireless microphone 101 is associated with (e.g., stamped with) a particular timestamp that is based on that wireless microphone's 101 local clock, then the timestamp may not be meaningful to the wireless receiver (with its own independent local clock). One way to overcome this is to determine and provide information to the wireless microphone 101 and/or to the wireless receiver 103 or 203 associated with an offset between the local clock of the wireless microphone 101 and the local clock of the wireless receiver 103 or 203. For example, it may be desirable to determine a common "presentation time" (PT) of each audio data packet, which may be the time when the audio contained in the data packet was physically present at the microphone. By determining an accurate estimate of the PT for an audio data packet, this may allow a receiving device (for example, the camera 801) to know the correct timing of when each received audio packet was generated, and to use this information to synchronize the received audio data from a given microphone such as with another set of audio data (for example from another microphone simultaneously sending its own audio data) or with video that may be recorded and/or received while the microphone(s) is/are sending the audio data.

Referring to the example flowchart of FIG. 14, at step 1401 the wireless receiver 103 or 203 may write a clock characteristic to a data packet and wirelessly transmit that data packet to a given one of the wireless microphones 101. The clock characteristic may be, for example, the value of any clock (for example, a high-resolution and/or high accuracy timer) that is available to the wireless receiver 103 or 203. For example, where the wireless receiver 203 uses an Apple iOS operating system, the clock may be the "Media Timer," which is the main iOS audio/video clock and is a system clock with nanosecond resolution. The Google Android operating system (which may alternatively be used by the wireless receiver 203) uses a similar system clock, which could be used as the clock used for generating the clock characteristic. As another example, the wireless receiver 103 or 203 may have an internal hardware-based clock or have access to an external clock source as the timer. Regardless of the type of clock used by the wireless receiver 103 or 203, the wireless receiver 103 or 203 may generate the clock characteristic based on (for example, to be equal to), the value of the clock. Step 1401 may be performed after a wireless connection with the wireless microphone 101 has been established, and before an audio subscription to the wireless microphone 101. The wireless microphone 101 may, in response to the data packet, generate and wirelessly transmit an acknowledgement packet (or other type of packet) to the wireless receiver 103 or 203. The wireless receiver 103 or 203 may measure (using its local clock) the round trip time from sending message at step 1401 until receiving the acknowledgement packet at step 1402.

The wireless receiver 103 or 203 may repeat this process of steps 1401 and 1402 a plurality of times, as indicated by steps 1403, 1404, and 1405. For example, the wireless receiver 103 or 203 may send a clock characteristic, receive a corresponding acknowledgement, and measure the round trip time, a total of three times, four times, five times, or any other number of times.

The wireless receiver 103 or 203 may determine a forward delay (the amount of time it takes to transmit in one direction, from the wireless microphone 101 to the wireless receiver 103 or 203 based on the plurality of measured round trip times. For example, the wireless receiver 103 or 203 may take an average (mean) or median of the round trip times and divide that average or mean by two to estimate the forward delay. For example, if the measured round trip times are A milliseconds, B milliseconds, and C milliseconds, then the forward delay may be determined as median (A, B, C)/2. Once the wireless receiver 103 or 203 has determined the forward delay, the wireless receiver 103 or 203 may write the clock characteristic one final time, taking the forward delay into account by adding it to the timestamp value of the clock characteristic. For example, if the time of the wireless receiver's local clock is X and the forward delay is Y, then the wireless receiver 103 or 203 may transmit a data packet indicating a timestamp of X+Y.

Thereafter, at step 1406, the wireless receiver 103 or 203 may subscribe to the audio data of the wireless microphone 101, and at steps 1407 and 1408 (and for each subsequent audio data packet), the wireless microphone 101 may transmit a plurality of audio data packets, such as by embedding audio data in one or more BLE data packets to form the audio data packets. Each audio data packet transmitted by the wireless microphone 101 may contain or otherwise be associated with a timestamp value representing the PT of the packet in the wireless receiver's local clock time base. The PT may represent the forward delay offset, and the wireless microphone 101 may use this value to adjust its timestamp included in the transmitted audio data packets. BLE may be used as a first protocol for establishing a connection of the wireless microphone 101 to the wireless receiver 103 or 203 (e.g., when performing any of steps 1401-1406), and then the wireless microphone 101 may shift to a second transmission protocol to send the audio data packets (such as, for example, by embedding audio into BLE data packets as described herein with respect to FIG. 3) once the connection is made.

Figure 15A:
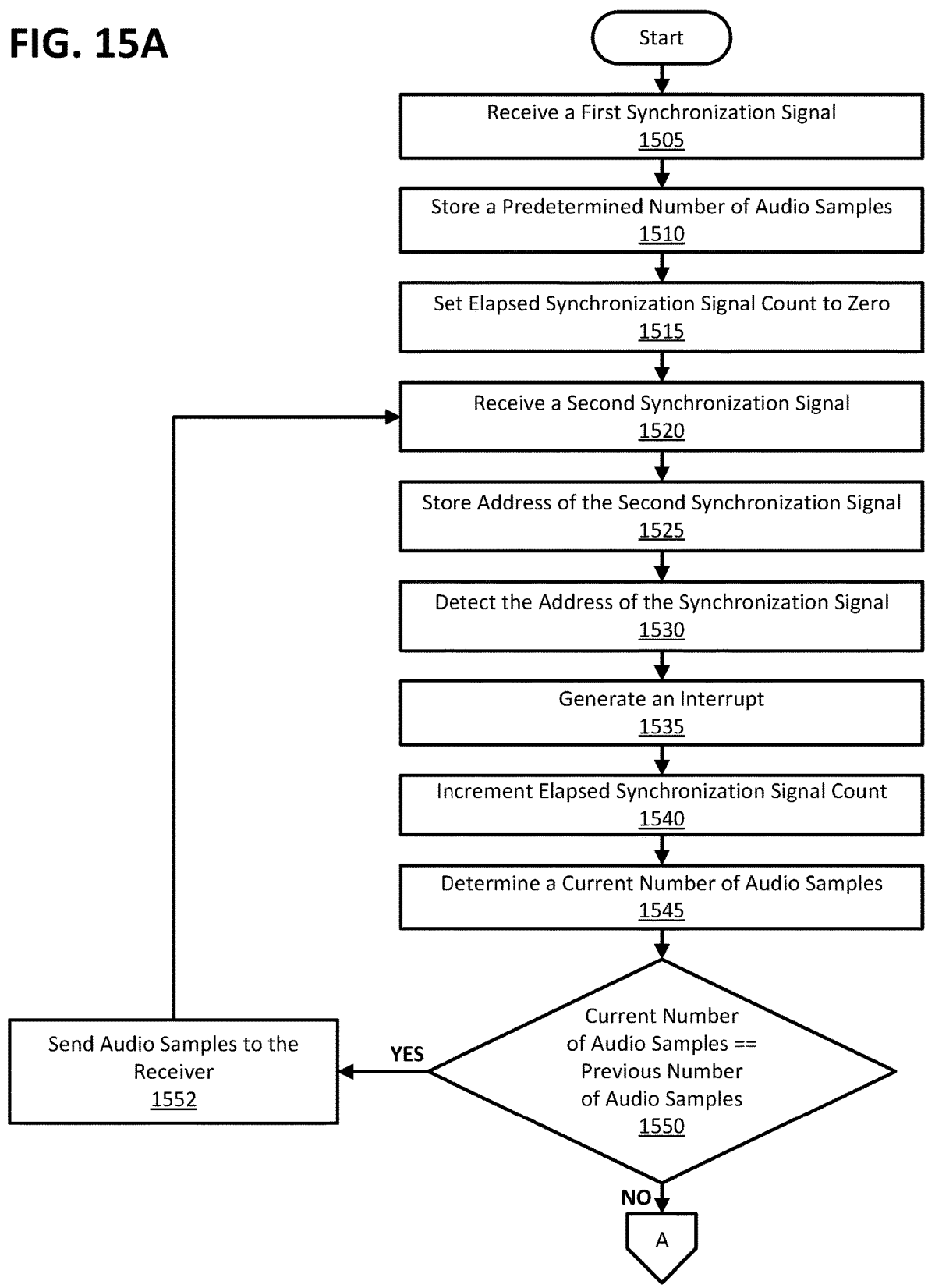
FIGS. 15A-15B is a flowchart showing an example process for synchronizing audio data between a wireless microphone and a wireless receiver.
Figure 15B:
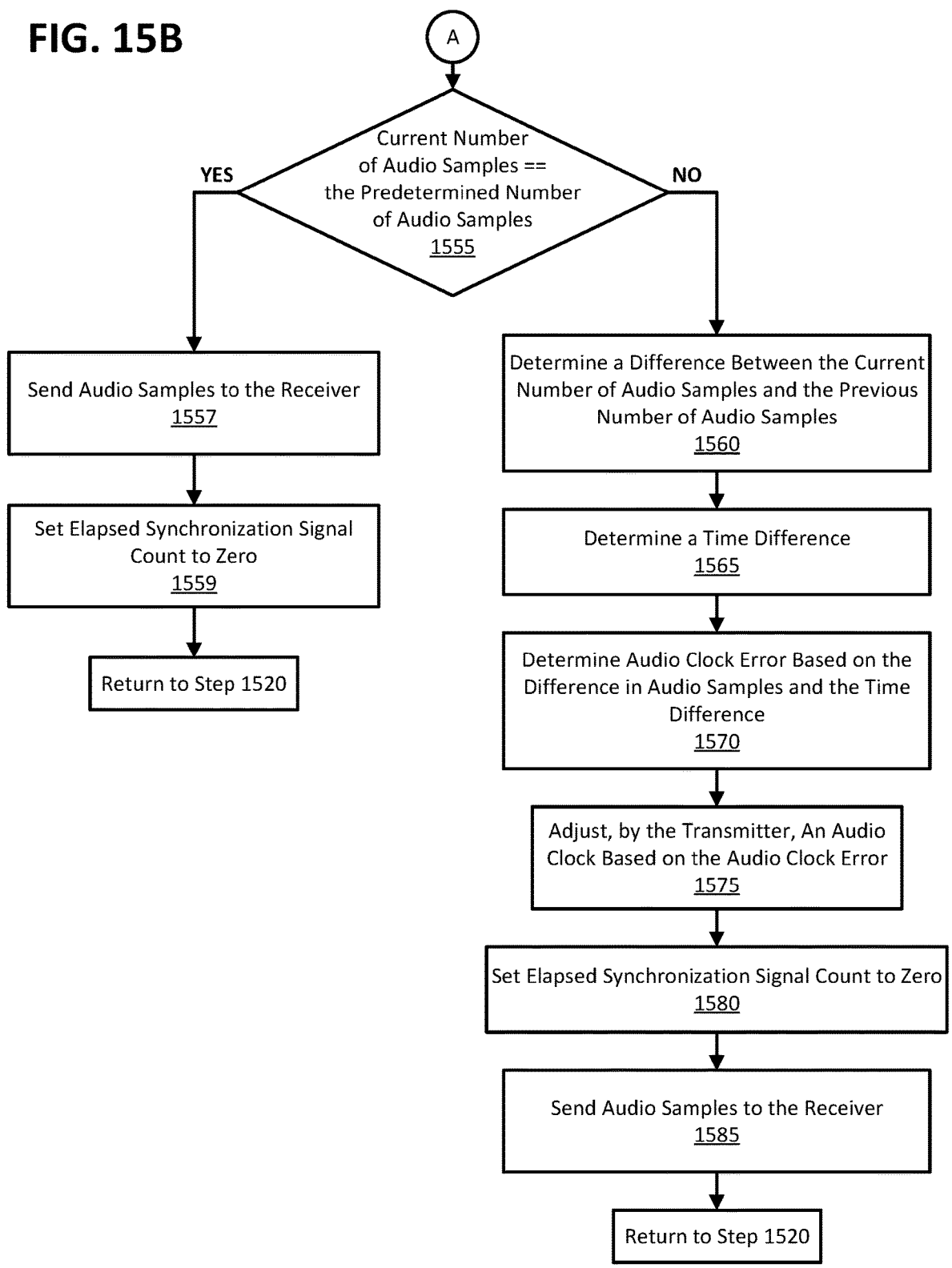

As noted above, the wireless receiver 103 or 203 may synchronize clocks with the wireless microphone 101 before subscribing to the audio data of the wireless microphone 101. After subscribing to the audio data of the wireless microphone 101, the wireless receiver 103 or 203 and one or more wireless microphones 101 may need to synchronize clocks to ensure that the data being received by the wireless receiver 103 or 203 is accurate. FIGS. 15A and 15B show a flowchart showing an example process for synchronizing audio data transmitted by a wireless microphone to a wireless receiver, for example, after the wireless receiver has subscribed to the audio data of the wireless microphone.

In step 1505, a transmitter (e.g., wireless microphone 101) may receive a first synchronization signal from a receiver (e.g., wireless receiver 103). In step 1510, the transmitter (e.g., wireless microphone 101) may store a predetermined number of audio samples, for example, in response to receiving the first synchronization signal. The predetermined number of audio samples may be a nominal number of audio samples stored in an audio sampling queue. The nominal number of audio samples may be defined by the receiver (e.g., wireless receiver 103) prior to the receiver subscribing to the audio data of the transmitter. The transmitter may discard all but the nominal number of audio samples stored in the audio sampling queue. That is, the transmitter may delete, or erase, audio samples that exceed the nominal number of audio samples, for example, based on or in response to receiving the first synchronization signal. Additionally, the transmitter may set an elapsed synchronization signal count to zero, in step 1515. The elapsed synchronization signal count may be set to zero, for example, based on or in response to receiving the first synchronization signal. Setting the elapsed synchronization signal count to zero may comprise resetting a counter.

Additionally or alternatively, setting the elapsed synchronization signal count to zero may comprise resetting an increment register to zero.

In step 1520, the transmitter may receive a second synchronization signal from the receiver. The second synchronization signal may be received at a predetermined interval (e.g., 10-20 ms) after the first synchronization signal. Each subsequent synchronization signal may be received at the predetermined interval. In step 1525, the transmitter may store an address of the synchronization signal. The address of the synchronization signal may be stored in a hardware register of the transmitter. In step 1530, the transmitter (e.g., a processor of the transmitter) may detect the address of the synchronization signal, for example, in the hardware register. In response to detecting the address of the synchronization signal, the transmitter may generate an interrupt, in step 1535. Additionally or alternatively, the transmitter may increment the elapsed synchronization signal counter, in step 1540.

In step 1545, the transmitter may determine a current number of audio samples in the audio sampling queue. The determination of the current number of audio samples may be determined, for example, based on or in response to the interrupt. Additionally, the determination of the current number of audio samples may be determined by querying, or otherwise monitoring, the audio sampling queue to determine a number of audio samples contained therein. In step 1550, the transmitter may determine whether the current number of audio samples is equal to a previous number of audio samples. If so, the transmitter may send audio samples to the receiver, in step 1552. Preferably, the audio samples are sent to the receiver via a wireless connection, as discussed in greater detail above. Sending the audio samples to the receiver may comprise transferring a number of audio samples from the audio sampling queue to a transmission queue. Additionally or alternatively, the transmitter may convert digital audio samples to analog audio samples prior to sending the audio samples to the receiver. The transmitter may use a digital-to-analog converter (DAC) to convert digital audio samples to analog audio samples. In some embodiments, the number of audio samples sent to the receiver in step 1552 may occur at predetermined intervals or with a fixed regularity. For example, the number of audio samples may be sent using the techniques described above in FIG. 3. That is, the number of audio samples may be sent as blocks, or chunks, of data. Alternatively, the number of audio samples may be transmitted continuously (e.g., streamed) from the transmitter to the receiver.

If the current number of audio samples is not equal to the previous number of audio samples, the transmitter may determine whether the current number of audio samples is equal to the predetermined number of audio samples, in step 1555. When the current number of audio samples is equal to the predetermined number of audio samples, the transmitter may send audio samples to a receiver, in step 1557. The audio samples may be sent using the techniques described above in step 1552. In step 1559, the transmitter may set the elapsed synchronization signal count to zero and return to step 1520 to monitor for the next synchronization signal.

When the current number of audio samples is not equal to the predetermined number of audio samples, the transmitter may recognize that an audio clock of the transmitter is drifting. That is, the transmitter may determine that its audio clock is drifting. In order to determine the direction of the drift and/or adjust the audio clock of the transmitter, the transmitter may determine a difference between the current number of audio samples and the previous number of audio samples, in step 1560. In this regard, if the current number of audio samples is greater than the previous number of audio samples, a positive integer may indicate that the audio clock of the transmitter is drifting toward being faster than the master audio clock of the receiver. If, on the other hand, the result is a negative integer, the transmitter may determine that the audio clock is drifting toward being slower than the master audio clock of the receiver. In step 1565, the transmitter may determine a time difference, for example, between the audio clock of the transmitter and the master audio clock of the receiver. The time difference may be determined by multiplying the elapsed synchronization signal count by a synchronization signal interval.

In step 1570, the transmitter may determine (e.g., compute) an audio clock error. The audio clock error may be determined using the difference between the current number of audio samples and the previous number of audio samples, determined in step 1560, and/or the time difference, determined in step 1565. The audio clock error may be a difference in hertz (Hz) between the audio clock of the transmitter and the master audio clock of the receiver. In step 1575, the transmitter may adjust an audio clock frequency of the transmitter's audio clock. That is, the transmitter may adjust the audio clock frequency of its audio clock in a direction opposite of the determined (e.g., detected) error and/or drift. For example, if the transmitter determines that the audio clock is drifting toward being slower than the master audio clock, the transmitter may adjust its audio clock to increase the frequency of the audio clock. By increasing the audio clock, the transmitter may increase a rate at which a microphone obtains audio samples. Alternatively, if the transmitter determines that the audio clock is drifting toward being faster than the master audio clock, the transmitter may adjust its audio clock to decrease the frequency of the audio clock. Decreasing the audio clock may cause the transmitter to obtain audio samples at a lower (less frequent) rate. Additionally or alternatively, adjusting the audio clock may comprise adjusting a frame boundary. As will be discussed in greater detail below with respect to FIG. 18, the audio clock frequency may be adjusted by writing a value to a register.

Once the audio clock has been adjusted, the transmitter may set the elapsed synchronization signal count to zero, in step 1580. Additionally or alternatively, the transmitter may set the previous number of audio samples to the current number of audio samples, in step 1580. Taken alone or in combination, these steps would allow the transmitter to detect drift in near real-time, thereby ensuring that multiple transmitters remain synchronized with the master clock of the receiver.

In step 1585, the transmitter may send audio samples to the receiver. The audio samples may be sent using the techniques described above in step 1552. The receiver may combine the audio samples with audio samples received from one or more second transmitters. Additionally or alternatively, the audio samples may be used to generate an audio file. The audio file may be played back immediately. Alternatively, the audio file may be stored for later editing, playback, and/or reproduction. After sending the audio samples to the receiver, the transmitter may return to step 1520 to monitor for further synchronization signals.

Figure 16A:
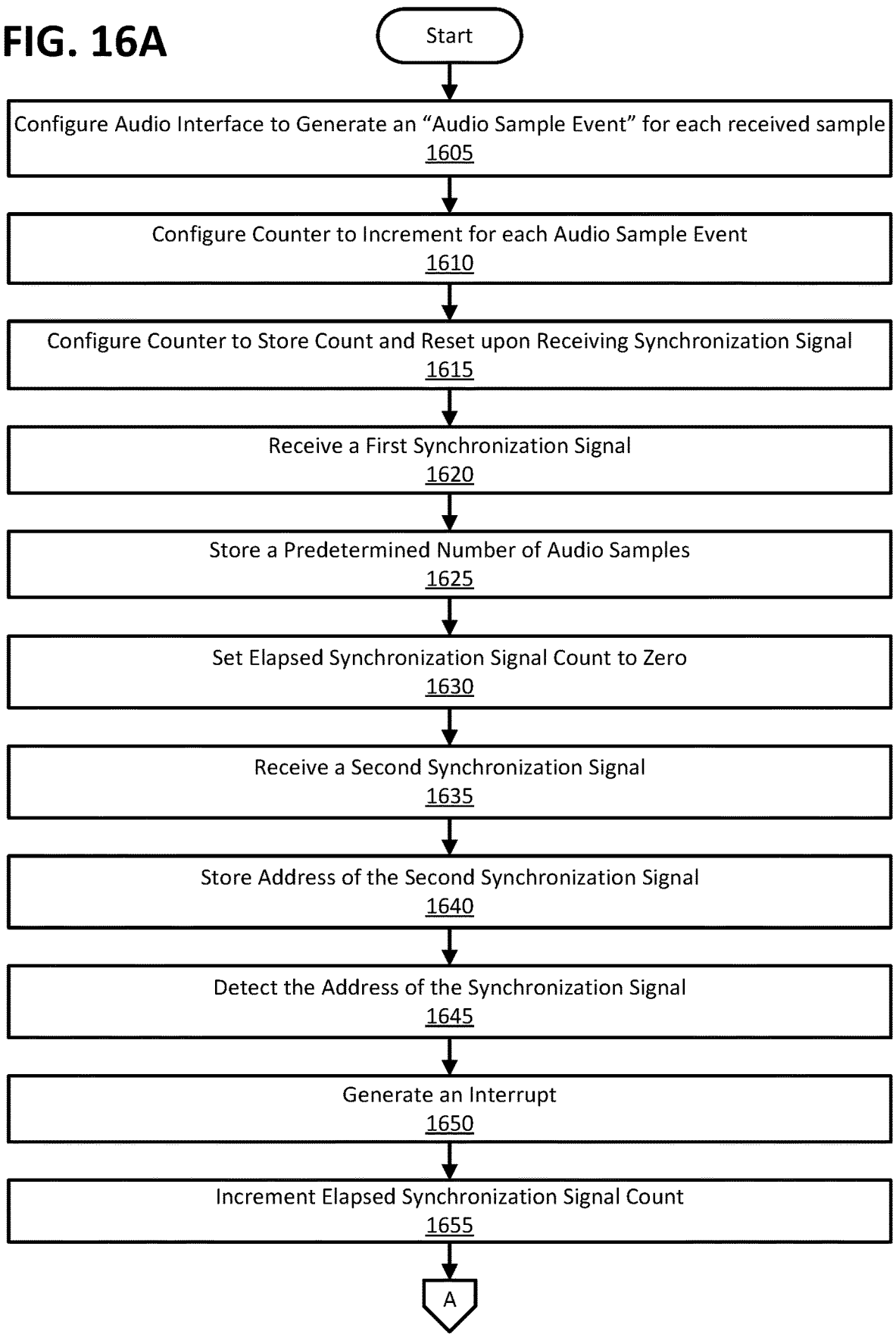
FIGS. 16A-16B is a flowchart showing an example process for synchronizing audio data between a wireless microphone and a wireless receiver.
Figure 16B:
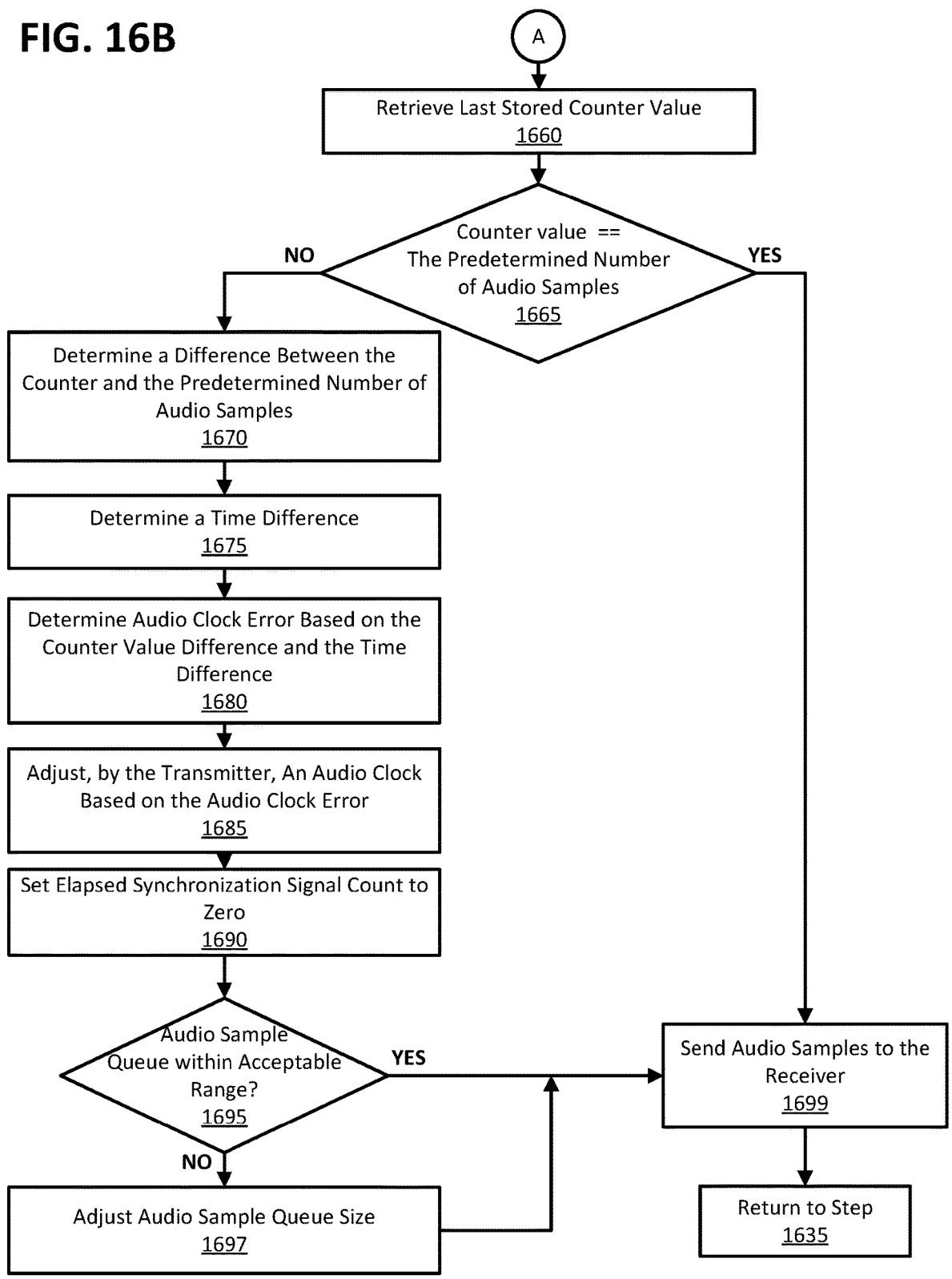

FIGS. 16A and 16B show a flowchart showing another example process for synchronizing audio data transmitted by a wireless microphone to a wireless receiver after the wireless receiver has subscribed to the audio data of the wireless microphone.

In step 1605, an audio interface of a transmitter (e.g., wireless microphone 101) may be configured to generate an audio sample event for each audio sample the transmitter receives. As will be discussed in greater detail with respect to FIG. 18, the audio interface may be an electrical serial bus interface (e.g., an Inter-IC Sound (I²S) interface) that is configured to connect digital audio devices together and/or communicate audio data between integrated circuits in an electronic device. An audio sample event may comprise receiving a block of data, for example, via the input (e.g., microphone) of the transmitter. The block of data may be a datagram or any other suitable chunk of data received via the input. Preferably, the chunk of data is a 24-bit PCM sample.

After the audio interface is configured to generate an audio sample event, a counter of the transmitter may be configured, in step 1610. Preferably, the counter may be configured to increment, for example, based on or in response to receiving an audio sample event. In step 1615, the counter may be further configured to store a count and reset upon receiving a synchronization signal. The count may be a predetermined of audio sample events that the transmitter may expect to receive between synchronization signals. Additionally or alternatively, storing the count may comprise setting the counter to an initial count of zero. The counter may also be configured to reset upon receiving a synchronization signal. In this regard, the counter may be configured to reset shortly after receiving the synchronization signal. Additionally or alternatively, the counter may be configured to output the count to a register, or any other suitable memory, and then reset the counter. As will be discussed in greater detail below with respect to step 1665, the counter may be used to determine whether a clock of the transmitter is drifting from a master clock, which may be maintained by the receiver (e.g., receiver 103). The configuring of the audio interface and the counter may occur as part of an initial set-up between the transmitter and/or receiver. Additionally or alternatively, the audio interface and the counter may be configured prior to the transmitter being bought and/or sold. That is, the audio interface and the counter may be configured according to factory settings.

After the audio interface and counter have been configured and after the receiver (e.g., receiver 103) has subscribed to the audio data of the transmitter (e.g., microphone 101), the transmitter may receive a first synchronization signal from the receiver, in step 1620. The first synchronization signal may be transmitted via a wireless communication link between the transmitter and the receiver. Alternatively, the first synchronization signal may be transmitted via a wired connection between the transmitter and the receiver.

In step 1625, the transmitter may store a predetermined number of audio samples, for example, based on receiving the first synchronization signal. Additionally, the transmitter may record the number of audio samples received, for example, using the counter described above. The predetermined number of audio samples may be a nominal number of audio samples received by the transmitter. As noted above, the nominal number of audio samples may be pre-configured. Additionally or alternatively, the nominal number of audio samples may be determined by the counter. That is, the nominal number of audio samples may be indicated by the number of audio sample events recorded by the counter. In this regard, the nominal number of audio samples maybe be indicated by the number of audio sample events recorded by the counter between a first synchronization signal (i.e., $sync_0$) and a second synchronization signal (i.e., $sync_1$). In some instances, the receiver (e.g., wireless receiver 103) may configure the transmitter with the nominal number of audio samples. In step 1630, the transmitter may set an elapsed synchronization signal count to zero. Setting the elapsed synchronization signal count to zero may comprise resetting a counter and/or an increment register to zero.

In step 1635, the transmitter may receive a second synchronization signal (i.e., $sync_n$, $n≥2$) from the receiver. The second synchronization signal may be received at a predetermined interval (e.g., 10-20 ms) after the first synchronization signal. Each subsequent synchronization signal may be received at the predetermined interval. In step 1640, the transmitter may store an address of the synchronization signal, for example, in a hardware register of the transmitter. More specifically, the address of the synchronization signal may be stored in a hardware register of a processor of the transmitter. In step 1645, the transmitter (e.g., a processor of the transmitter) may detect the address of the synchronization signal in the hardware register. In step 1650, the transmitter may generate an interrupt, for example, based on or in response to detecting the address of the synchronization signal in the hardware register. In step 1655, the transmitter may increment the elapsed synchronization signal counter, for example, based on or in response to detecting the address of the synchronization signal in the hardware register.

In step 1660, the transmitter may retrieve the last stored counter value, for example, based on or in response to receiving the second synchronization signal. As noted above, the counter value may be stored in a register, or other suitable memory location, in response to receiving a synchronization signal. In step 1660, the counter value may be retrieved from the register or other suitable memory location. In step 1665, the transmitter may compare the current counter value to the previous/expected counter value, for example, to determine whether a clock of the transmitter is drifting from the master clock of the receiver. In some examples, the transmitter may compare a current counter value, based on a first quantity of audio samples received since the previous synchronization signal (i.e., at the time synch is received), to a prior counter value (i.e., a second quantity of audio samples received between $sync_{n-2}$ and $sync_{n-1}$). Additionally or alternatively, the transmitter may compare a current counter value to an expected counter value, for example, based on the number of audio samples the transmitter expected to receive between synchronization signals. As noted above, the number of audio samples the transmitter expected to receive between synchronization signals may be pre-configured and/or configured during an initial set-up/synchronization between the transmitter and the receiver. When the counter value is equal to the previous/expected counter value, the transmitter may determine that its audio clock is not drifting and send a plurality of audio samples to the receiver, in step 1699. The process may then repeat by returning to step 1635.

When the counter value is not equal to the previous/expected counter value, the transmitter may recognize that an audio clock of the transmitter is drifting. That is, the transmitter may determine that its audio clock is drifting. In step 1670, the transmitter may determine a difference between the current counter value and the prior counter value, for example, in order to determine a degree and/or direction of the drift. Additionally or alternatively, the transmitter may determine a difference between the current counter value and the expected (e.g., configured) counter value (e.g., a quantity of audio samples received between synchronization signals), in step 1670. If the current counter value is greater than the prior counter value and/or the expected counter value (e.g., a positive integer), the transmitter may determine that its audio clock is drifting toward being faster than the master audio clock of the receiver. If, on the other hand, the result is a negative integer, the transmitter may determine that the audio clock is drifting toward being slower than the master audio clock of the receiver.

In step 1675, the transmitter may determine a time difference, for example, between the audio clock of the transmitter and the master audio clock of the receiver. The time difference may be determined by multiplying the elapsed synchronization signal count by a synchronization signal interval.

In step 1680, the transmitter may determine (e.g., compute) au audio clock error. The audio clock error may be determined using the difference between the current count value and the prior/expected counter value, determined in step 1670, and/or the time difference, determined in step 1675. The audio clock error may be a difference in hertz (Hz) between the audio clock of the transmitter and the master audio clock of the receiver.

In step 1685, the transmitter may adjust an audio clock frequency of the transmitter's audio clock. That is, the transmitter may adjust the audio clock frequency of its audio clock in a direction opposite of the determined (e.g., detected) error and/or drift. For example, if the transmitter determines that the audio clock is drifting toward being slower than the master audio clock, the transmitter may adjust its audio clock to increase the frequency of the audio clock. By increasing the audio clock, the transmitter may increase a rate at which a microphone obtains audio samples. Alternatively, if the transmitter determines that the audio clock is drifting toward being faster than the master audio clock, the transmitter may adjust its audio clock to decrease the frequency of the audio clock. Decreasing the audio clock may cause the transmitter to obtain audio samples at a lower (less frequent) rate. Additionally or alternatively, adjusting the audio block may comprise adjusting a frame boundary. In step 1690, the transmitter may set the elapsed synchronization signal count to zero, for example, after the audio clock has been adjusted. As noted above, the steps described in FIGS. 16A and 16B allow the transmitter to detect drift in near real-time, thereby ensuring that multiple transmitters remain synchronized with the master clock of the receiver.

In step 1695, the transmitter may determine whether the audio sample queue is within an acceptable range. That is, the transmitter may determine whether the audio sample queue is too big. Allowing the audio sample queue to grow too large may increase the end-to-end latency of audio samples being played out at the receiver relative to the time of their capture at the microphone element. Alternatively, the transmitter may determine whether the audio sample queue is too small and, therefore, dropping audio samples. The acceptable range may be the expected number of audio samples +/−n. If the audio sample queue is within an acceptable range, the transmitter may send audio samples to the receiver, in step 1699. As noted above, the audio samples may be sent to the receiver via a wireless connection. Additionally or alternatively, the transmitter may convert digital audio samples (e.g., digital PCM samples) to a compressed format prior to sending the audio samples to the receiver. The compressed format may reduce the required data rate on the wireless interface. To generate the compressed format, the transmitter may use a transcoder function (e.g., codec) or an encoder to generate the compressed format digital audio samples. In some embodiments, the audio samples may be sent to the receiver at predetermined intervals or with a fixed regularity. Alternatively, the audio samples may be streamed from the transmitter to the receiver. The receiver may receive the compressed format digital audio samples and perform an inverse transcode function (e.g., codec) or decoder to generate the audio samples. The receiver may then combine the audio samples with audio samples received from one or more second transmitters. Additionally or alternatively, the audio samples may be used to generate an audio file. The audio file may be played back immediately. Alternatively, the audio file may be stored for later editing, playback, and/or reproduction. After sending the audio samples to the receiver, the transmitter may return to step 1635 to monitor for further synchronization signals.

If the audio sample queue is not within an acceptable range, the transmitter may adjust the number (e.g., quantity) of audio samples that the audio sample queue is capable of handling, in step 1697. If the number of audio samples in the audio sampling queue has grown too large, an audio sample may be discarded. Conversely, if the number of audio samples in the audio sampling queue is too small, a dummy (e.g., mute) codeword may be inserted into the audio sampling queue. After adjusting the size of the audio sample queue, the transmitter may send audio samples to the receiver in step 1699.

The process described above and shown in FIGS. 15A and 15B and/or FIGS. 16A and 16B may be performed at regular intervals when the receiver has subscribed to the data of the transmitter. As noted above, the process ensures that the transmitter and receiver remain synchronized and provide a way for the transmitter to adjust its audio clock to ensure that the devices remain synchronized.

Figure 17:
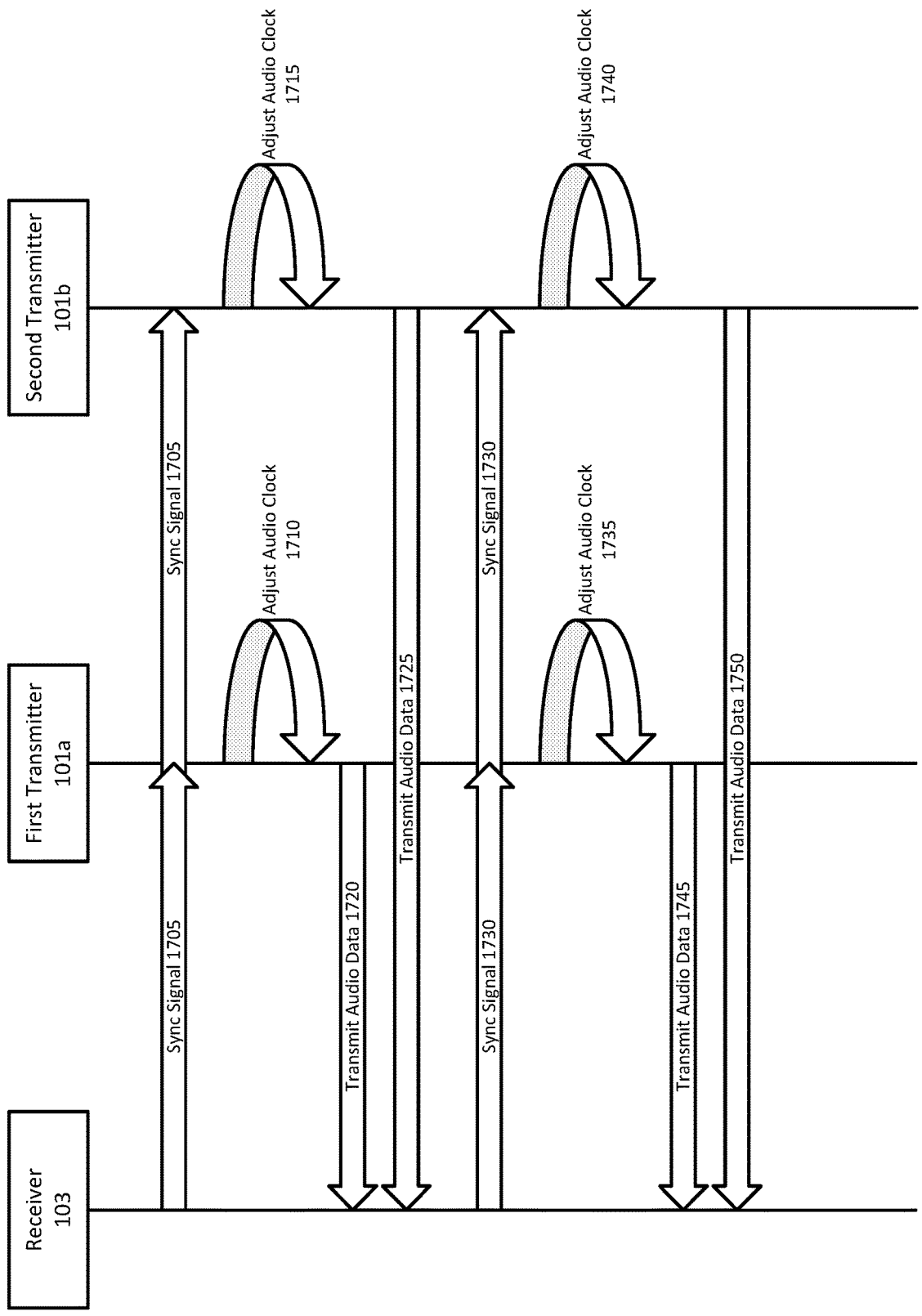
FIG. 17 is a flowchart showing an example process for synchronizing a plurality of transmitters.

As noted above, the receiver may subscribe to the data of a plurality of transmitters. FIG. 17 shows an example of a process for synchronizing a plurality of transmitters. In particular, FIG. 17 shows receiver 103, first transmitter 101a, and second transmitter 101b. Receiver 103, first transmitter 101a, and second transmitter 101b may be any of the receivers or transmitters described herein. While two transmitters are shown in FIG. 17, it will be appreciated that more transmitters can be included in the system shown in FIG. 17 without diverging from the description herein.

In step 1705, receiver 103 may send a synchronization signal to first transmitter 101a and/or second transmitter 101b. The synchronization signal may be broadcast wirelessly by the receiver 103 to first transmitter 101a and/or second transmitter 101b. Additionally or alternatively, receiver 103 may transmit (e.g., send) a first synchronization signal to first transmitter 101a and a second synchronization signal to second transmitter 101b. In some embodiments, the first synchronization signal and the second synchronization signal may be separate transmissions. In step 1710, first transmitter 101a may adjust a first audio clock, for example, using the steps discussed above. Similarly, in step 1715, second transmitter 101b may adjust a second audio clock using the processes discussed above. It will be appreciated that steps 1710 and/or 1715 may be skipped, for example, if either the first transmitter 101a and/or the second transmitter 101b determine that their audio clock does not need to be adjusted and/or corrected. In step 1720, first transmitter 101a may transmit (send) first audio data to receiver 103. The first audio data may be sent to receiver 103 via a first wireless connection between first transmitter 101a and receiver 103. Similarly, in step 1725, second transmitter 101b may transmit (send) second audio data to receiver 103. The second audio data may be sent to receiver 103 via a second wireless connection between second transmitter 101b and receiver 103. Receiver 103 may combine the first audio data and the second audio data to generate an audio file. The audio file may be played back immediately and/or stored for editing and/or reproduction.

In step 1730, receiver 103 may send another synchronization signal to first transmitter 101*a* and/or second transmitter 101*b*. The synchronization signal may be sent using any of the techniques described above with respect to step 1705. Further, receiver 103 may transmit synchronization signals to first transmitter 101*a* and/or second transmitter 101*b* at predetermined intervals (e.g., 10-20 ms). In step 1735, first transmitter 101*a* may adjust the first audio clock. In step 1740, second transmitter 101*b* may adjust the second audio clock. In step 1745, first transmitter 101*a* may transmit (send) third audio data to receiver 103. The third audio data may be a continuation of the first audio data transmitted to the receiver 103 in step 1720. In step 1750, second transmitter 101*b* may transmit (send) fourth audio data to receiver 103. The fourth audio data may be the next portion of the second audio data transmitted, for example, in step 1725. As noted above, receiver 103 may combine the third audio data and the fourth audio data to generate an audio file. In some examples, the third audio data and the fourth audio data may be added to the audio file generated from the first audio data and the second audio data.

While only two cycles are shown in FIG. 17, it will be appreciated that the cycles shown in FIG. 17 may continue for as long as receiver 103 is subscribed to first transmitter 101*a* and/or second transmitter 101*b*. As noted above, the process shown in FIG. 17 provides a technique that allows the transmitter and receiver to remain synchronized without having the transmitter timestamp synchronization signals received from the receiver. Moreover, the transmitter adjusting its audio clock ensures that the devices remain synchronized despite the transmitter's audio clock drifting in different directions.

Figure 18:
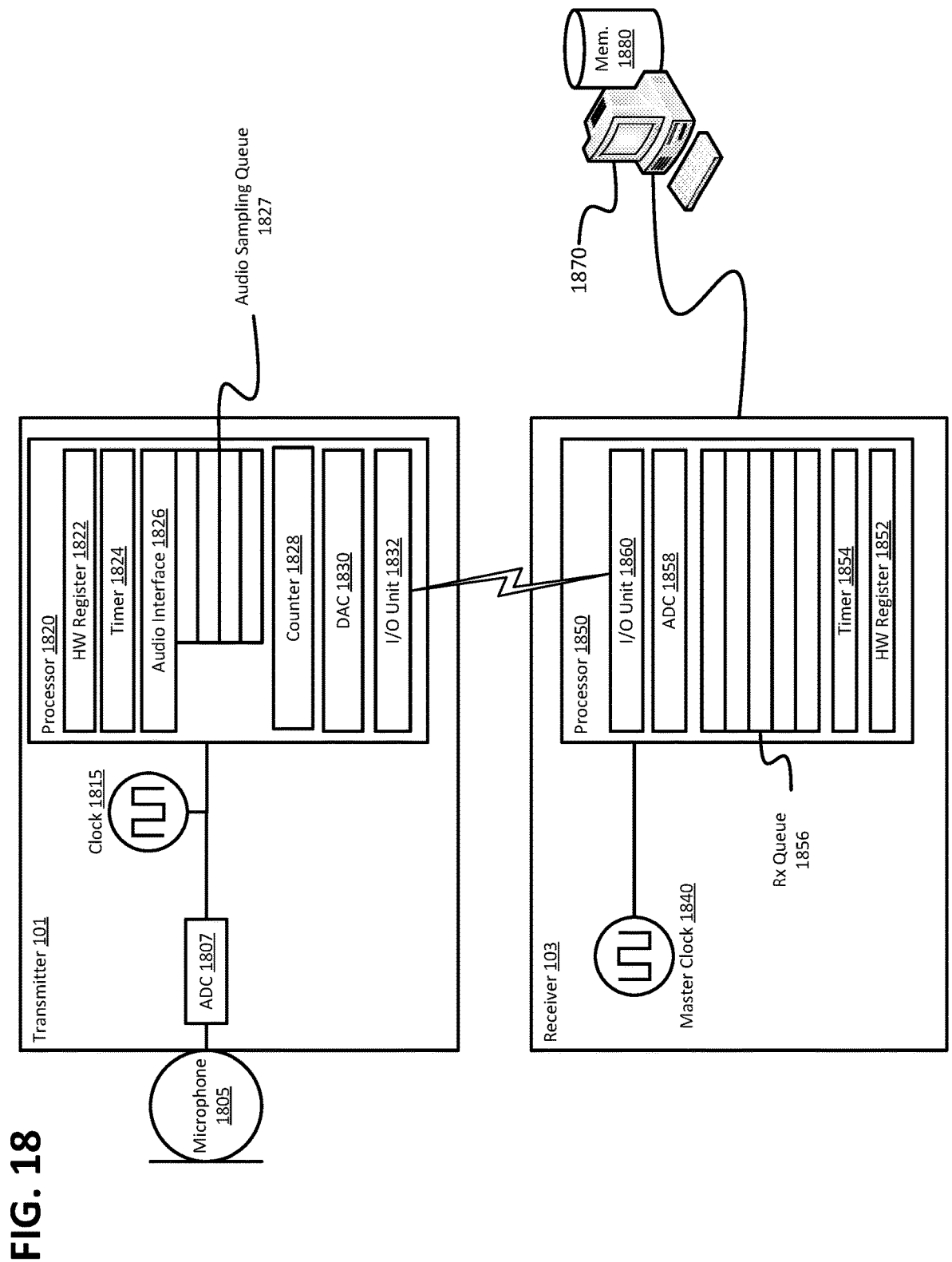
FIG. 18 shows an example of a modular wireless microphone system configured to synchronize at least one wireless transmitter with at least one receiver by adjusting an audio clock of the at least one transmitter.

FIG. 18 shows an example of a modular wireless microphone system configured to synchronize at least one wireless transmitter with at least one receiver by adjusting an audio clock of the at least one transmitter. The modular wireless microphone system shown in FIG. 18 comprises a transmitter 101, a receiver 103, and/or a computing device 1870.

Transmitter 101 may be a microphone configured to obtain one or more audio samples via an input device. Preferably, transmitter 101 is a wireless microphone. Transmitter 101 may comprise input device 1805, an analog-to-digital converter (ADC) 1807, clock 1815, and/or processor 1820. Input device 1805 may be any suitable microphone configured to obtain audio samples (e.g., singing, instrumentals, etc.). ADC 1807 may be configured to convert analog audio, obtained via input device 1805, into digital samples to be stored in an audio sampling queue (e.g., audio sampling queue 1827, discussed in greater detail below).

Clock 1815 may be an oscillator configured to generate clock frequencies for audio applications. Clock 1815 may be suitable for use as the source clock for audio peripherals. Preferably, clock 1815 is a 32 MHz crystal oscillator. Clock 1815 may have an adjustable frequency in two frequency bands: between 11.176 MHz and 11.402 MHz and between 12.165 MHz and 12.411 MHz. Clock 1815 may have low jitter, suitable for the audio applications. In audio applications where audio data is arriving asynchronously to on-chip clocks, the frequency of clock 1815 may be adjusted to remain in synchronization with the receiver 103. In this regard, the frequency may be configured via a value written to a register (not shown). For the frequency range 11.176 MHz to 11.402 MHz, three values may be written to the register. For example, a minimum value (e.g., 12519) may cause the clock 1815 to oscillate at 11.176 MHz, a center value (e.g., 15298) may cause the clock 1815 to oscillate at 11.289 MHz, and a maximum value (e.g., 16068) may cause the clock 1815 to oscillate at 11.402 MHz. For the frequency range 12.165 MHz to 12.411 MHz, three values may also be written to the register. For example, a minimum value (e.g., 36834) may cause the clock 1815 to oscillate at 12.165 MHz, a center value (e.g., 39854) may cause the clock 1815 to oscillate at 12.288 MHz, and a maximum value (e.g., 42874) may cause the clock 1815 to oscillate at 12.411 MHz. By updating the value stored in the register, the audio clock (e.g., clock 1815) of the transmitter 101 may be adjusted to correct any drift determined by the transmitter 101 such that the transmitter 101 and the receiver 103 remain synchronized by adjusting a number of audio samples obtained by the input device 1805.

Processor 1820 may be configured to perform (execute) one or more audio applications. Processor 1820 may be a system-on-a-chip (SOC) or an application specific integrated circuit (ASIC), such as the Nordic® nRF5340 semiconductor. As shown in FIG. 18, processor 1820 may comprise a hardware register 1822, a timer 1824, an audio interface 1826, a counter 1828, a DAC 1830, and/or an I/O unit 1832; however, it will be appreciated that processor 1820 may comprise additional, or fewer, components that are beyond the scope of this disclosure. For example, processor 1820 may comprise an audio encoder (not shown). The audio encoder may reduce the data rate required to send packets to the receiver 103 wirelessly.

The hardware register 1822 may be configured to store an address of a synchronization signal received from receiver 103. For example, the hardware register 1822 may be any suitable register associated with processor 1820 that is configured to store the address of the synchronization signal received from receiver 103. The hardware register 1822 may be configured to cause an interrupt to be generated, for example, in response to storing the address of the synchronization signal. Additionally or alternatively, hardware register 1822 may generate an interrupt based on the address of the synchronization signal being written thereto.

Timer 1824 may be configured to execute time intervals. In some instances, the time intervals may be defined via user input. Timer 1824 may be driven by a high-frequency clock source, such as clock 1815. Timer 1824 may include a four-bit pre-scaler (not shown) that can divide the timer input clock. A timer event may trigger a task on another system peripheral. For example, the timer event may cause the transmitter 101 to send audio data to receiver 103. Timer 1824 may be configured to operate in either a Timer Mode or a Counter Mode. In Timer Mode, timer 1824's internal counter register may be incremented by one for every tick of the timer frequency. In Counter Mode, timer 1824's internal counter register may be incremented by one each time a count task is triggered. This means that the timer frequency and the pre-scaler may not be utilized in counter mode.

Audio interface 1826 may be configured to receive one or more audio samples. Audio interface 1826 may comprise an Inter-IC Sound ($I^2S$) interface. Additionally or alternatively, audio interface 1826 may comprise any equivalent electrical serial bus interface that is capable of connecting digital audio devices together and/or being used to communicate audio data between integrated circuits in an electronic device. Audio interface 1826 may comprise audio sampling queue 1827. Audio sampling queue 1827 may be any suitable memory device configured to temporarily store audio samples obtained by input device 1805. Preferably, audio sampling queue 1827 may comprise a buffer or a cache. Audio sampling queue 1827 may comprise memory that is separate from processor 1820. Alternatively, audio sampling queue 1827 may comprise a portion, or subset, of a memory of the processor 1820.

Counter 1828 may be any suitable counter. Counter 1828 may be configured to increment, for example, in response to receiving an audio sample. Additionally or alternatively, counter 1828 may increment in response to receiving an audio sample event. Counter 1828 may be reset (i.e., set to zero ("0")), for example, in response to, or shortly after, receiving a synchronization signal from receiver 103. In some examples, counter 1828 may be one or more registers of processor 1820.

DAC 1830 may be configured to convert one or more digital audio samples to one or more analog audio samples prior to being sent to receiver 103. In some embodiments, DAC 1830 may receive one or more digital audio samples from audio sampling queue 1827. DAC 1830 may compress the digital audio samples (e.g., digital PCM samples) to a compressed format, for example, using a transcoder function (e.g., codec) or an encoder. DAC 1830 may then convert (transform) the one or more digital audio samples (e.g., compressed digital audio samples) to one or more analog audio samples. In further embodiments, DAC 1830 may be embedded in I/O unit 1832. The one or more analog audio samples may then be sent to receiver 103, for example, via I/O unit 1832.

I/O unit 1832 may be a radio embedded in processor 1820 that modulates and/or transmits packets containing the data in the audio sampling queue 1827. I/O unit 1832 may be configured to exchange data with one or more devices, including, for example, the receiver 103. I/O unit 1832 may be a wireless network interface. I/O unit 1832 may be configured to wirelessly transmit audio data in accordance with the techniques and/or processes described herein. Additionally, I/O unit 1832 may be configured to receive a synchronization signal from a master audio clock, such as master clock 1840 (described in greater detail below). I/O unit 1832 may comprise a 2.4 GHz transceiver capable of supporting multiple radio standards, such as BLE, IEEE 802.15.4, and/or proprietary radio standards.

Receiver 103 may be configured to receive audio data from one or more transmitters. Receiver 103 may be further configured to combine the audio data to generate (create) one or more audio files. Receiver 103 may playback the one or more audio files. Additionally or alternatively, receiver 103 may store the one or more audio files, for example on computing device 1870, for editing and/or reproduction. As shown in FIG. 18, receiver 103 comprises master clock 1840 and processor 1850. It will be appreciated that receiver 103 may comprise additional, or fewer, components that are beyond the scope of this disclosure.

Master clock 1840 may be an oscillator configured to generate clock frequencies for audio applications. Clock 1840 may be any suitable oscillator capable of generating a frequency of 32 MHz for audio peripherals and/or audio applications.

Processor 1850 may be similar to processor 1820 discussed above. That is, processor 1850 may be configured to perform (execute) one or more audio applications. Additionally, processor 1850 may be a SOC or ASIC. Processor 1850 may comprise a hardware register 1852, a timer 1854, a reception queue 1856, an analog-to-digital converter (ADC) 1858, and/or an I/O unit 1860. Processor 1850 may comprise additional, or fewer, components, such as an audio decoder (not shown). The audio decoder may accurately recreate audio samples received from transmitter 101. Like hardware register 1822, hardware register 1852 may be any suitable register associated with processor 1850. Timer 1854 may be configured to execute time intervals. I/O unit 1860 may be a radio embedded in processor 1850 that de-modulates and/or receives packets from one or more devices, such as transmitter 101. I/O unit 1860 may be a wireless network interface configured to wirelessly receive audio data from one or more transmitters and send synchronization signals to the one or more transmitters at predetermined intervals (e.g., 10-20 ms). Like I/O unit 1832 above, I/O unit 1860 may comprise a 2.4 GHz transceiver capable of supporting multiple radio standards, such as BLE, IEEE 802.15.4, and/or proprietary radio standards. ADC 1856 may be configured to convert one or more analog audio samples, received from transmitter 101, to one or more digital audio samples. ADC 1858 may receive one or more analog audio samples from I/O unit 1860. I/O 1860 may and convert (transform) the one or more analog audio samples to one or more digital audio samples. I/O 1860 may decompress the digital audio samples (e.g., digital PCM samples) to a decompressed format, for example, using an inverse transcoder function (e.g., codec) or a decoder. In some examples, ADC 1858 may be embedded in I/O unit 1860 to convert the analog radio signal received from transmitter 101 back to digital data. The one or more digital audio samples may then be stored in reception queue 1856 for additional and/or further processing. Reception queue 1856 may be configured to receive one or more audio samples from one or more transmitters after the one or more audio samples are received via I/O unit 1860 and/or transformed using ADC 1858. Preferably, reception queue 1856 may comprise a buffer or cache. In some examples, reception queue 1856 may send (transmit) the one or more audio samples to computing device 1870.

Computing device 1870 may be communicatively coupled to receiver 103. In this regard, computing device 1870 may be configured to receive one or more audio samples from receiver 103 and generate one or more audio files from the one or more audio samples. Additionally or alternatively, computing device 1870 may be configured to receive one or more audio files from receiver 103. Computing device 1870 may be a mobile device, such as a cellular phone, a mobile phone, a smart phone, a tablet, a laptop, or an equivalent thereof. Additionally or alternatively, computing device 1870 may be a desktop computer, laptop computer, or, alternatively, a virtual computer. In some embodiments, computing device 1870 may comprise a server, such as a stand-alone server, a corporate server, a server located in a server farm or cloud-computer environment, and/or a virtual server hosted on hardware capable of supporting a plurality of virtual servers. In some embodiments, computing device 1870 may be an audio mixer or a mixing console configured to mix the one or more audio samples.

Computing device 1870 may be comprise memory 1880 to store the one or more audio samples and/or the one or more audio files. Memory 1880 may comprise volatile and/or nonvolatile, removable and/or non-removable media implemented in any method or technology for storage of information such as computer-readable instructions, data structures, program modules, or other data. Memory 1880 may comprise one or more physical persistent memory devices and/or one or more non-persistent memory devices. Memory 1880 may comprise random access memory (RAM), read only memory (ROM), electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by computing device 1870. In some embodiments, memory 1880 may comprise a database, such as a relational database, a hierarchical databases, a distributed database, an in-memory databases, a flat file database, an XML database, a NoSQL databases, a graph database, and/or any combination thereof Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A transmitter comprising:
    an audio clock;
    one or more processors; and
    memory storing instructions that, when executed by the one or more processors, cause the transmitter to:
        receive, from a receiver, a synchronization signal;
        based on receiving the synchronization signal, determine a difference between a counter value indicating a first quantity of received audio samples and an expected counter value;
        adjust the audio clock based on the difference between the counter value indicating the first quantity of received audio samples and the expected counter value;
        transfer a number of audio samples from an audio sampling queue to a transmission queue; and
        send, to the receiver, the number of audio samples at a predetermined interval.

2. The transmitter of claim 1, wherein the transmitter comprises at least one of:
    a wireless microphone; or
    a lavalier microphone.

3. The transmitter of claim 1, wherein the instructions, when executed by the one or more processors, cause the transmitter to store an address field of the synchronization signal.

4. The transmitter of claim 3, wherein storing the address field of the synchronization signal comprises storing the address field in a hardware register.

5. The transmitter of claim 3, wherein the instructions, when executed by the one or more processors, cause the transmitter to generate an interrupt in response to storing the address filed of the synchronization signal.

6. The transmitter of claim 1, wherein adjusting the audio clock comprises at least one of:
    increasing a rate at which a microphone obtains audio samples; or
    decreasing a rate at which the microphone obtains audio samples.

7. The transmitter of claim 1, wherein adjusting the audio clock comprises adjusting a frame boundary.

8. The transmitter of claim 1, wherein the transmitter further comprises an analog-to-digital converter (ADC) configured to convert digital audio samples to analog audio samples prior to being sent to the receiver.

9. The transmitter of claim 1, wherein the expected counter value is based on a second quantity of audio samples received between prior synchronization signals.

10. The transmitter of claim 1, wherein the expected counter value is based on a quantity of audio samples configured by the receiver.

11. A system comprising:
    a receiver configured to transmit a synchronization signal at predetermined intervals; and
    a transmitter configured to:
        receive, from the receiver, the synchronization signal;
        in response to receiving the synchronization signal, determine a difference between a counter value indicating a first quantity of received audio samples and an expected counter value;
        adjust an audio clock of the transmitter based on the counter value indicating the first quantity of received audio samples and the expected counter value;
        transfer a number of audio samples from an audio sampling queue to a transmission queue; and
        send, to the receiver, the number of audio samples at a predetermined interval.

12. The system of claim 11, wherein the receiver comprises at least one of:
    a wireless receiver;
    a mobile device;
    a smart phone;
    a tablet; or
    a laptop.

13. The system of claim 11, wherein the transmitter comprises at least one of:
    a wireless microphone; or
    a lavalier microphone.

14. The system of claim 11, wherein the transmitter is further configured to store an address field of the synchronization signal.

15. The system of claim 14, wherein the address field is stored in a hardware register of the transmitter.

16. The system of claim 14, wherein the transmitter is further configured to generate an interrupt in response to storing the address field of the synchronization signal.

17. The system of claim 11, further comprising a second transmitter configured to:
    receive, from the receiver, the synchronization signal;
    in response to receiving the synchronization signal, determine a second difference between a second counter value indicating a second quantity of received audio samples and a second expected counter value; and
    adjust a second audio clock of the second transmitter based on the difference between the second counter value indicating the second quantity of received audio samples and the second expected counter value.

18. The system of claim 11, wherein adjusting the audio clock of the transmitter comprises at least one of:
    increasing a rate at which the transmitter obtains audio samples; or
    decreasing a rate at which the transmitter obtains audio samples.

19. The system of claim 11, wherein adjusting the audio clock of the transmitter comprises adjusting a frame boundary.

20. The system of claim 11, wherein the transmitter comprises a digital-to-analog converter (DAC) to convert digital audio samples to analog audio samples.

21. The system of claim 20, wherein the receiver comprises an analog-to-digital converter (ADC) to convert the analog audio samples to second digital audio samples.

22. The system of claim 12, wherein the expected counter value is based on at least one of:

a second quantity of audio samples received between prior synchronization signals; or a quantity of audio samples configured by the receiver.

23. A method comprising:

receiving, by a transmitter from a receiver, a synchronization signal;

in response to receiving the synchronization signal, determining, by the transmitter, a difference between a counter value indicating a first quantity of received audio samples and an expected counter value;

adjusting, by the transmitter, an audio clock based on the difference between the counter value indicating a first quantity of received audio samples and the expected counter value;

transferring a number of audio samples from an audio sampling queue to a transmission queue; and sending, to the receiver, the number of audio samples at a predetermined interval.

24. The method of claim 23, wherein adjusting the audio clock comprises at least one of:

increasing a rate at which a microphone obtains audio samples;

decreasing a rate at which the microphone obtains audio samples; or adjusting a frame boundary.

25. The method of claim 23, wherein the expected counter value is based on at least one of:

a second quantity of audio samples received between prior synchronization signals; or a quantity of audio samples configured by the receiver.

\* \* \* \* \*

UNITED STATES PATENT AND TRADEMARK OFFICE
CERTIFICATE OF CORRECTION

| | | |
|---|---|---|
| PATENT NO. | : 12,204,811 B2 | Page 1 of 1 |
| APPLICATION NO. | : 18/169923 | |
| DATED | : January 21, 2025 | |
| INVENTOR(S) | : Beavis et al. | |

It is certified that error appears in the above-identified patent and that said Letters Patent is hereby corrected as shown below:

In the Claims

Column 28, Line 66:
In Claim 22, delete "claim 12," and insert --claim 11--

Signed and Sealed this
Fifteenth Day of April, 2025

Coke Morgan Stewart
*Acting Director of the United States Patent and Trademark Office*